United States Patent
Lee et al.

(10) Patent No.: US 11,231,901 B2
(45) Date of Patent: Jan. 25, 2022

(54) DISPLAY DEVICE PERFORMING SCREEN MIRRORING AND OPERATING METHOD THEREOF

(71) Applicant: SAMSUNG ELECTRONICS CO., LTD., Suwon-si (KR)

(72) Inventors: Jongin Lee, Suwon-si (KR); Kwansik Yang, Suwon-si (KR); Kilsoo Choi, Suwon-si (KR); Sehyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/117,733

(22) Filed: Dec. 10, 2020

(65) Prior Publication Data

US 2021/0181939 A1  Jun. 17, 2021

(30) Foreign Application Priority Data

Dec. 12, 2019 (KR) .......... 10-2019-0166004

(51) Int. Cl.
*G06F 3/14* (2006.01)
*G06F 3/0484* (2013.01)
(Continued)

(52) U.S. Cl.
CPC .......... *G06F 3/1454* (2013.01); *G06F 3/0481* (2013.01); *G06F 3/0482* (2013.01);
(Continued)

(58) Field of Classification Search
CPC ............... G06F 3/04883; G06F 3/0482; G06F 3/04842; G06F 3/1454; G06F 3/14;
(Continued)

(56) References Cited

U.S. PATENT DOCUMENTS 9,632,648 B2 * 4/2017 Lee ................... H04N 21/4126
9,830,052 B2 * 11/2017 Seo ..................... G06F 3/1454
(Continued)

FOREIGN PATENT DOCUMENTS

JP    2015-133637 A    7/2015
KR   10-2009-0012367   2/2009
(Continued)

OTHER PUBLICATIONS

PCT International Search Report dated Mar. 30, 2021 for PCT/KR2020/017947.

*Primary Examiner* — Nicholas Ulrich
(74) *Attorney, Agent, or Firm* — Nixon & Vanderhye P.C.

(57) ABSTRACT

A display device includes: a display, a communicator comprising communication circuitry configured to communicate with a mobile device, a memory storing one or more instructions, and a processor configured to execute the one or more instructions stored in the memory to: control the display to display a second screen corresponding to a first screen output on the mobile device and an indicator based on the display device mirroring a screen of the mobile device, control the communicator to receive object information regarding one or more objects included in the first screen from the mobile device, and to control movement of the indicator based on the object information and the control signal, in response to receipt of a control signal including interaction information regarding the indicator.

18 Claims, 23 Drawing Sheets

(51) Int. Cl.
*G06F 3/0482* (2013.01)
*H04N 21/422* (2011.01)
*G06F 3/0481* (2013.01)
*G06F 3/0489* (2013.01)
*H04M 1/72469* (2021.01)

(52) U.S. Cl.
CPC ...... *G06F 3/04812* (2013.01); *G06F 3/04842* (2013.01); *G06F 3/04892* (2013.01); *H04N 21/42204* (2013.01); *H04N 21/42218* (2013.01); *H04M 1/72469* (2021.01)

(58) Field of Classification Search
CPC ...... G06F 9/452; G06F 3/04817; G06F 3/048; G06F 3/0481; G06F 3/04847; G06F 3/0484; G06F 2203/0384; G06F 3/04812; G06F 2203/0383; G06F 9/451; G06F 3/0236; G06F 3/0483; G06F 3/04892; H04B 1/205; H04N 21/42204; H04N 21/42218; H04N 21/4222; H04N 21/4126; H04M 1/72469
See application file for complete search history.

(56) References Cited

U.S. PATENT DOCUMENTS

| | | | |
|---|---|---|---|
| 10,326,822 B2* | 6/2019 | Reichling | G06F 3/04842 |
| 10,606,542 B2 | 3/2020 | Manchinasetti et al. | |
| 2011/0020782 A1 | 1/2011 | Ko | |
| 2013/0219072 A1 | 8/2013 | Han et al. | |
| 2015/0149920 A1* | 5/2015 | Alsina | H04L 67/26 715/740 |
| 2015/0288912 A1 | 10/2015 | Chun et al. | |
| 2017/0272681 A1* | 9/2017 | Oh | H04N 21/443 |
| 2018/0364881 A1* | 12/2018 | Lee | G06F 3/0481 |

FOREIGN PATENT DOCUMENTS

| | | |
|---|---|---|
| KR | 10-2017-0083796 | 7/2017 |
| KR | 10-1918040 | 1/2019 |

\* cited by examiner

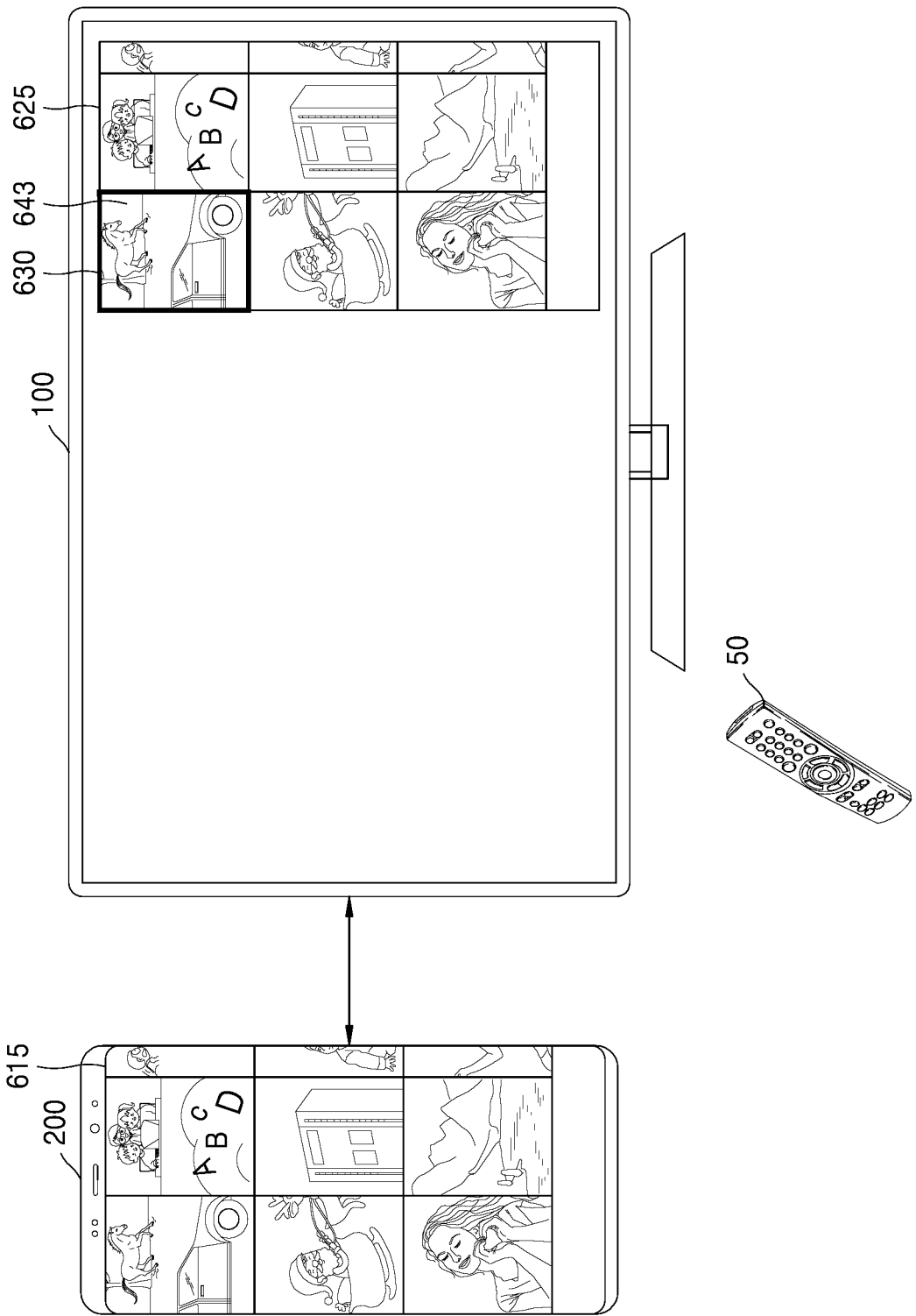

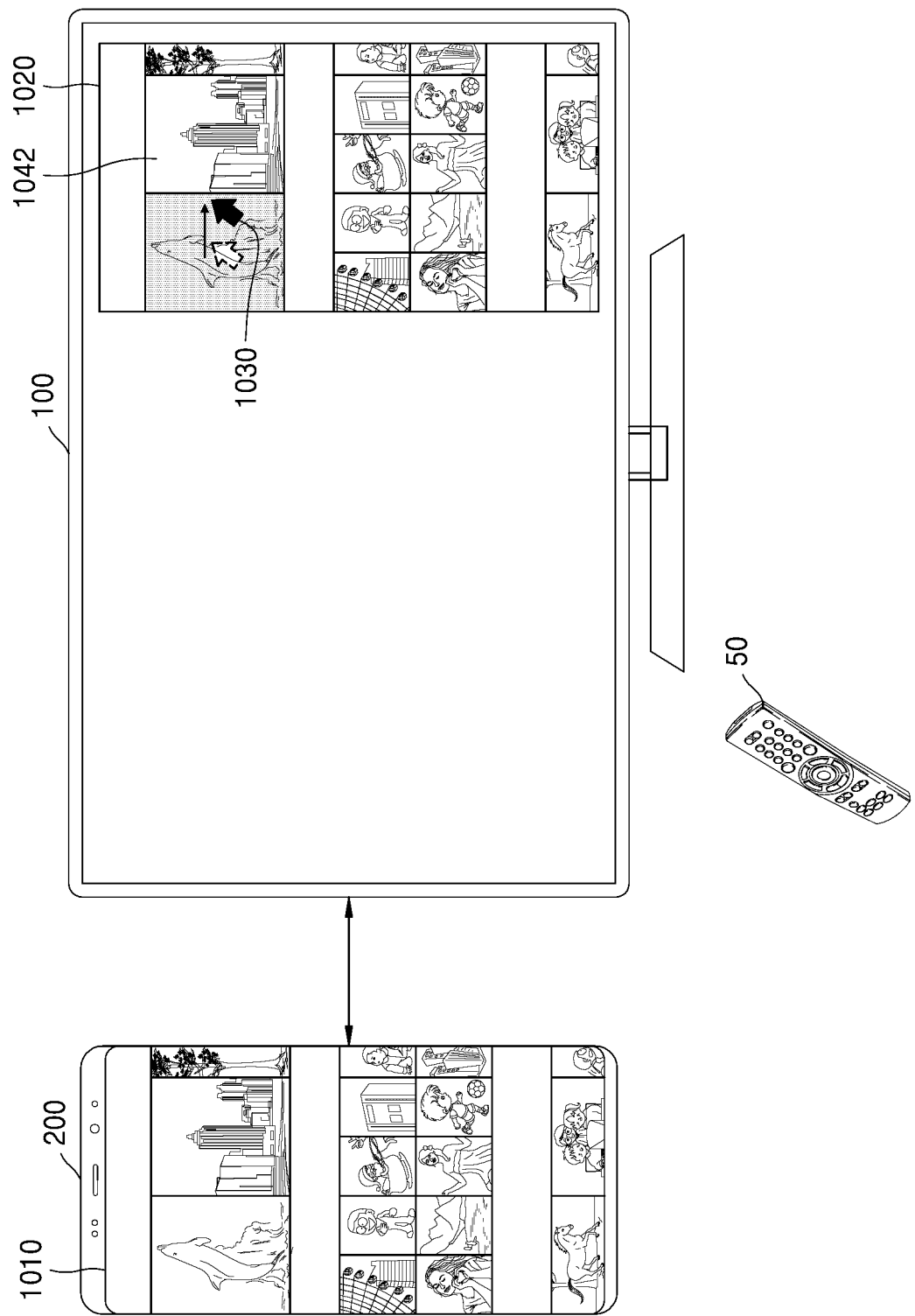

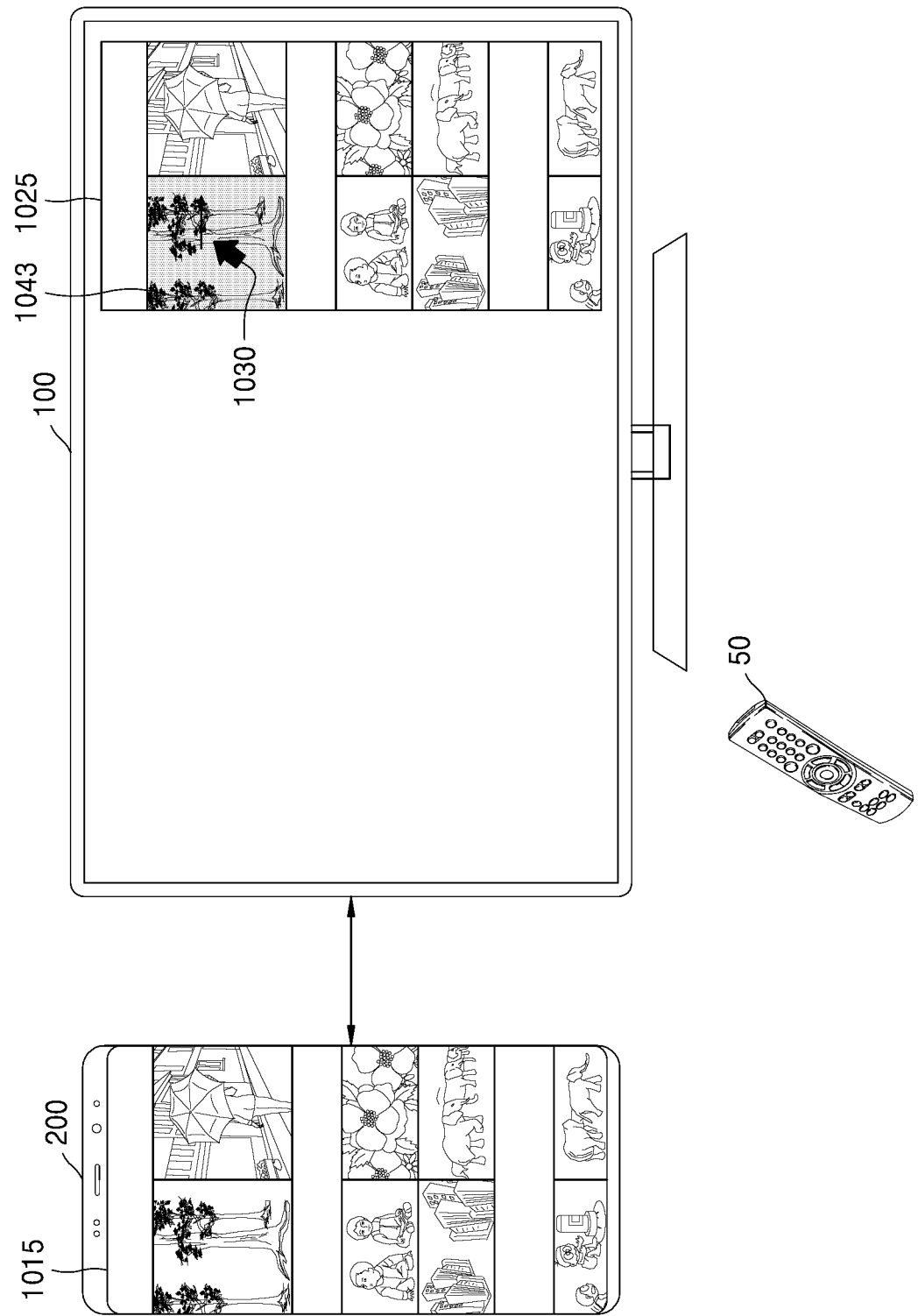

DISPLAY DEVICE PERFORMING SCREEN MIRRORING AND OPERATING METHOD THEREOF

CROSS-REFERENCE TO RELATED APPLICATION

This application is based on and claims priority under 35 U.S.C. § 119 to Korean Patent Application No. 10-2019-0166004, filed on Dec. 12, 2019, in the Korean Intellectual Property Office, the disclosure of which is incorporated by reference herein in its entirety.

BACKGROUND

1. Field

The disclosure relates to a display device and an operating method thereof, and for example, to a display device which displays a screen output on a mobile device by mirroring the screen and performs an interaction with the displayed mirroring screen using a control device, and an operating method of the display device.

2. Description of Related Art

With the development of wired/wireless communication networks, electronic devices that output data visually perceivable by a user by displaying a screen may be interconnected via a wired/wireless communication network.

The electronic devices may transmit and receive various data to and from one another via the wired/wireless communication network, in which an electronic device may remotely control another electronic device or may be used using the other electronic device. For the above-described remote control or shared use between electronic devices, a mirroring technique has been used.

The mirroring technique allows devices including displays to share and process screen data.

The mirroring technique has been developed to be applied to any electronic device capable of outputting a screen through a display such as a portable computer like a laptop computer, a netbook, a tablet personal computer (PC), etc., a portable terminal like a smartphone or a personal digital assistant (PDA), a television (TV), and so forth. A mirroring service enabling screen sharing and mutual remote control by applying the mirroring technique to multiple electronic devices has been provided.

SUMMARY

Embodiments of the disclosure provide a display device which displays a screen output on a connected mobile device by mirroring the screen and easily performs interaction with the displayed mirroring screen using a control device, and an operating method of the display device.

Additional aspects will be set forth in part in the description which follows and, in part, will be apparent from the description.

A display device according to an example embodiment of the disclosure includes: a display, a communicator comprising communication circuitry configured to communicate with a mobile device, a memory storing one or more instructions, which, when executed, cause a processor to be configured to: control the display to display a second screen corresponding to a first screen output on the mobile device and an indicator based on the display device mirroring a screen of the mobile device, control the communicator to receive object information regarding one or more objects included in the first screen from the mobile device, and control movement of the indicator based on the object information and the control signal, in response to receipt of a control signal including user interaction information regarding the indicator.

The control signal according to an embodiment of the disclosure includes the user interaction information for moving the indicator.

The object information according to an embodiment of the disclosure includes at least one of position information of the one or more objects, information about an object that adjoins the one or more objects, timestamp information, or information regarding whether the one or more objects are associated with critical movement.

The processor according to an embodiment of the disclosure is further configured to execute the one or more instructions to allocate a number to each of the one or more objects included in the second screen and control the display to display the allocated number.

The processor according to an embodiment of the disclosure is further configured to execute the one or more instructions to move the indicator to an object to which the indicator is allocated, in response to receipt of a control signal including user interaction information to select the number.

The processor according to an embodiment of the disclosure is further configured to execute the one or more instructions to generate navigation map information of the one or more objects based on the object information and control movement of the indicator based on the navigation map information.

The processor according to an embodiment of the disclosure is further configured to execute the one or more instructions to determine based on the object information and the navigation map information whether the control signal includes user interaction information regarding an object associated with critical movement, and control the communicator to transmit the user interaction information regarding the object to the mobile device when the control signal includes the user interaction information regarding the object associated with critical movement.

The user interaction information regarding the object according to an embodiment of the disclosure includes user interaction information to move the indicator to an object that causes a page changeover operation among the one or more objects.

The processor according to an embodiment of the disclosure is further configured to execute the one or more instructions to, based on a screen of the mobile device being changed from the first screen to a third screen as the mobile device performs an operation corresponding to the user interaction information regarding the object, control the display to display a fourth screen corresponding to the third screen by mirroring the third screen.

The processor according to an embodiment of the disclosure is further configured to execute the one or more instructions to perform an operation corresponding to the user interaction information regarding the object when the control signal does not include the user interaction information regarding the object associated with critical movement.

A method of operating a display device according to an embodiment of the disclosure includes: displaying a second screen corresponding to a first screen output on a mobile device and an indicator based on the display device mirroring a screen of the mobile device, receiving object information regarding one or more objects included in the first screen from the mobile device, receiving a control signal including user interaction information regarding the indicator, and controlling movement of the indicator based on the object information and the control signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A, 6B and 6C are diagrams illustrating an example in which an indicator displayed on a display device moves based on a user interaction, in the display device according to various embodiments;

FIGS. 10A, 10B, 10C and 10D are diagrams illustrating an example in which an indicator displayed on a display device a moves based on a user interaction, in the display device according to various embodiments;

DETAILED DESCRIPTION

Figure 1:
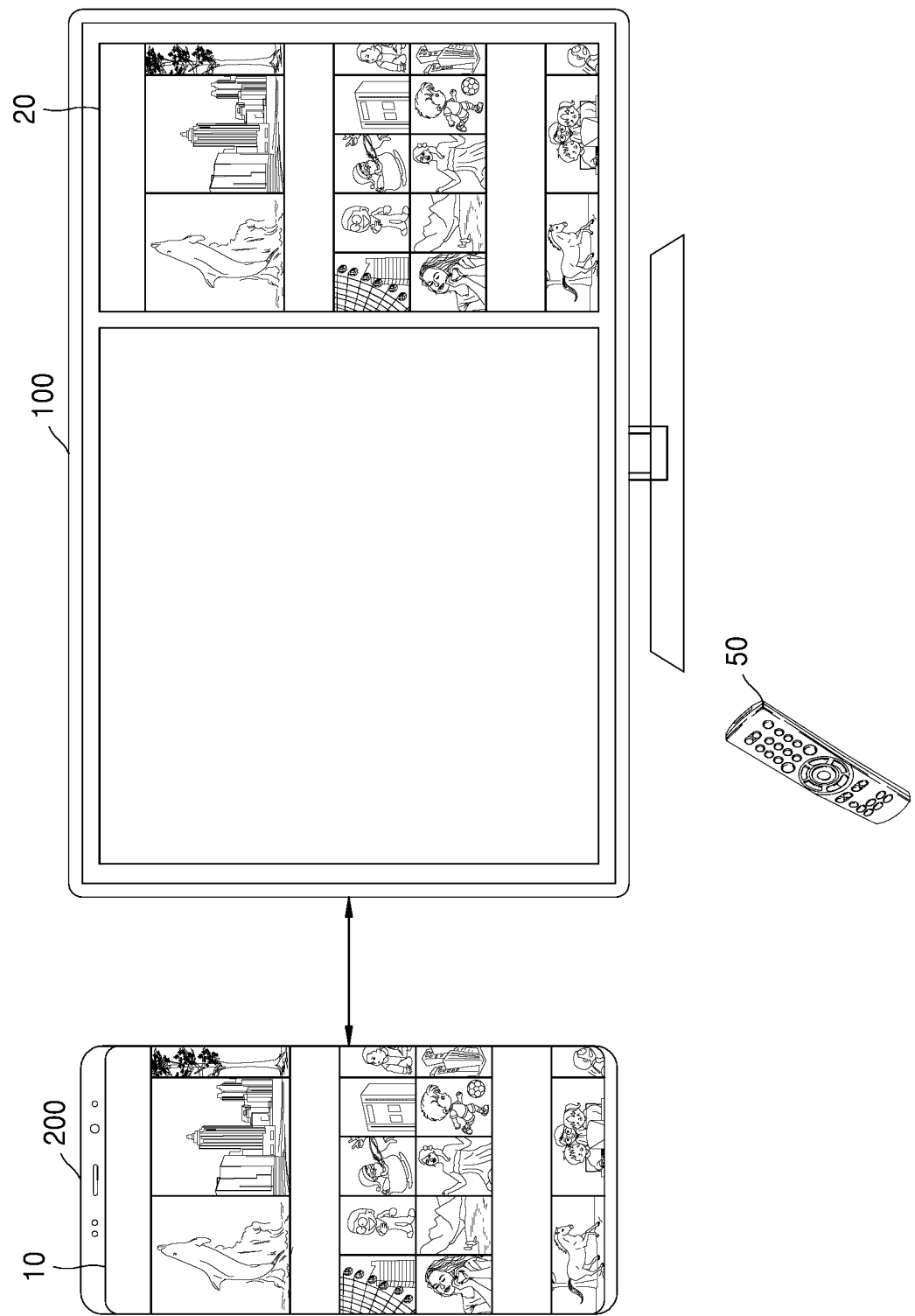
FIG. 1 is a diagram illustrating an example mirroring system according to various embodiments.

Terms used herein will be described in brief, and the disclosure will be described in greater detail.

Although terms used in the disclosure are selected with general terms used at present in consideration of functions in the disclosure, the terms may vary according to the intention of those of ordinary skill in the art, judicial precedents, or introduction of new technology. In addition, in some cases, terms may be arbitrarily selected, and in such cases, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when it is assumed that a certain part "includes" a certain component, a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof.

In an embodiment of the specification, the term "user" may refer, for example, to a person who controls a function or an operation of a home appliance (or a peripheral device), a display device, and a mobile device, and may include a manager or an installation engineer.

Hereinafter, various example embodiments will be described in greater detail with reference to the attached drawings. However, the disclosure may be implemented in various forms, and are not limited to the embodiments described herein. To clearly describe the disclosure, parts that are not associated with the description may be omitted from the drawings, and throughout the disclosure, identical reference numerals refer to identical parts.

FIG. 1 is a diagram illustrating an example mirroring system according to various embodiments.

Referring to FIG. 1, a mirroring system according to an embodiment may include an electronic device 200 and a display device 100. The electronic device 200 and the display device 100 according to an embodiment may be devices providing a mirroring function. The mirroring function may refer, for example, to a function that enables devices including displays to share and process screens (or screen data).

To provide the mirroring function, a device for providing an image (or a screen) may transmit data regarding the image to be shared to a device for being provided with the image. The device for providing the image may be referred to as a source device or a master device, and the device being provided with the image may be referred to as a sink device or a client device. For example, in FIG. 1, the electronic device 200 according to an embodiment may be a source device or a master device and the display device 100 according to an embodiment may be referred to as a sink device or a client device.

The electronic device 200 according to an embodiment may be any electronic device capable of providing a mirroring function by sharing and displaying a screen. For example, the electronic device 200 may include, but is not limited to, electronic devices capable of outputting a screen through a display such as a portable computer like a laptop computer, a netbook, a tablet PC, etc., a portable terminal like a smartphone or a PDA, a TV, and so forth. In an embodiment, the electronic device 200 operating as a source device in screen mirroring may be an electronic device having a portable form, and hereinafter, the electronic device 200 operating as a source device will be referred to as a 'mobile device' 200.

The display device 100 according to an embodiment, which may include an electronic device including a display, may be implemented in various forms such as, for example, and without limitation, a cellular phone, a tablet PC, a digital camera, a camcorder, a laptop computer, a tablet PC, a desktop, an electronic (e)-book terminal, a digital broadcasting terminal, a PDA, a PMP, a navigator, an MP3 player, a wearable device, and so forth. The display device 100 may be of a fixed-type electronic device arranged at a fixed position or a portable-type electronic device having a portable form, and may be a digital broadcasting receiver capable of receiving digital broadcasting. In particular, embodiments may be easily implemented in, but is not limited to, a TV, a digital TV, a smart TV, digital signage, a digital signal, etc., capable of providing a screen having a larger size than a screen of the mobile device 200.

The user may use the mirroring function between the mobile device 200 and the display device 100 to watch an image output on the mobile device 200 through a large screen. In this case, the mobile device 200 and the display device 100 may be connected via a communication network. The communication network connecting the mobile device 200 with the display device 100 may include a wired/wireless communication network capable of transmitting and receiving certain data. For example, a communication network may be formed according to wireless network standards such as a local area network (LAN), a wide area network (WAN), a wireless LAN (WLAN) (Wireless Fidelity (WiFi), WiFi Direct, etc.), wireless broadband (WiBro), code division multiple access (CDMA), wireless CDMA (WCDMA), short range communication (near field communication (NFC)), Bluetooth, etc. The communication network may be a wired network such as a high definition multimedia interface (HDMI) cable, a mobile high definition link (MHL) cable, etc., which connects the mobile device 200 with the display device 100 via a wired cable.

When the mirroring function is used, the screen output through the display of the mobile device 200 may be mirrored and the mirrored screen may be output through the display of the display device 100. In this case, the screen may refer, for example, to an image output through the display or a region of the display where the image is displayed.

The mirroring technique used to provide the mirroring function may include, but is not limited to, a display as a service (Daas), miracast, airplay, digital living network allicane (DLNA), etc. In an embodiment, to transmit information or data regarding a screen corresponding to the screen output on the mobile device 200 to the display device 100, the above-described mirroring techniques may be used.

Referring to FIG. 1, the mobile device 200 according to an embodiment may display a first screen 10. For example, the first screen 10 may be, but is not limited to, a user interface screen including one or more objects.

Upon execution of the mirroring function, the display device 100 according to an embodiment may mirror the first screen 10 output on the mobile device 200 to display a second screen 20 corresponding to the first screen 10 on a display. The second screen 20 may be displayed on the entire region or a partial region of the display. The second screen 20 may be all or a part of the first screen 10 and may be an enlarged or reduced screen of the first screen 10.

The display device 100 may have an advantage of a "lean-back experience" due to characteristics of the display device 100 having a large screen. Herein, the "lean-back experience" may refer, for example, to a user experience (UX) to which simplicity and comfort are key as if the user enjoys contents on a large screen by merely holding a remote controller (control device) of a display device while leaning back against a large sofa like when lying.

To manipulate a screen without hindering a viewing environment of the user watching a mirroring screen (second screen), there is a need for a method of manipulating the second screen 20 using a control device 50 that controls the display device 100 instead of controlling the first screen 10 of the mobile device 200.

The control device 50 according to an embodiment may be implemented with various forms of devices for controlling the display device 100, like a remote controller or a cellular phone. Alternatively, the control device 50 may control the display device 100 using short-range communication including infrared communication or Bluetooth. The control device 50 may control a function of the display device 100 using at least one of a key (including a button), a touch pad, a microphone (not shown) capable of receiving a user's voice, or a sensor (not shown) capable of recognizing a motion of the control device 50, which is provided therein.

Hereinafter, by referring to the drawings, an example method of manipulating a mirroring screen displayed on the display device 100 using the control device 50 will be described in greater detail.

Figure 2:
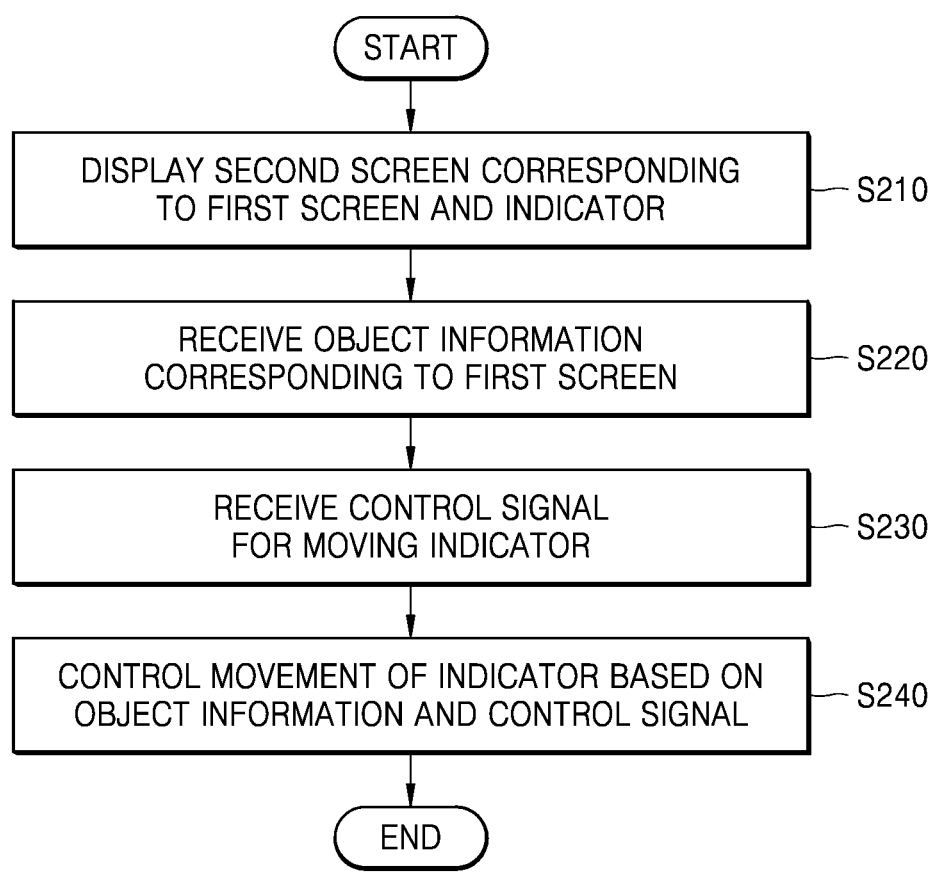
FIG. 2 is a flowchart illustrating an example method of operating a display device according to various embodiments.

FIG. 2 is a flowchart illustrating an example method of operating a display device according to various embodiments.

Referring to FIG. 2, the display device 100 according to an embodiment may mirror a first screen output on the mobile device 200 connected with the display device 100. The display device 100 may receive mirroring data corresponding to the first screen from the mobile device 200.

The display device 100 may display a second screen corresponding to the first screen based on the mirroring data, and display an indicator on the second screen, in operation S210.

In this case, the display device 200 may display the second screen on the entire region or a partial region of the display. The second screen may be all or a part of the first screen and may be an enlarged or reduced screen of the first screen.

The display device 100 may receive object data (information) corresponding to the first screen from the mobile device 200, in operation S220.

The display device 100 may receive the object information together when receiving the mirroring data of the first screen, or may request the object information to and receive the object information from the mobile device 200 when receiving a control signal including user interaction information (e.g., a user input of four-direction keys of the control device) from the control device. Upon receipt of a user input for requesting mirroring in the mobile device 200, the object information may be transmitted to the display device 100. However, the disclosure is not limited to this example. The object information will be described with reference to FIG. 3.

Figure 3:
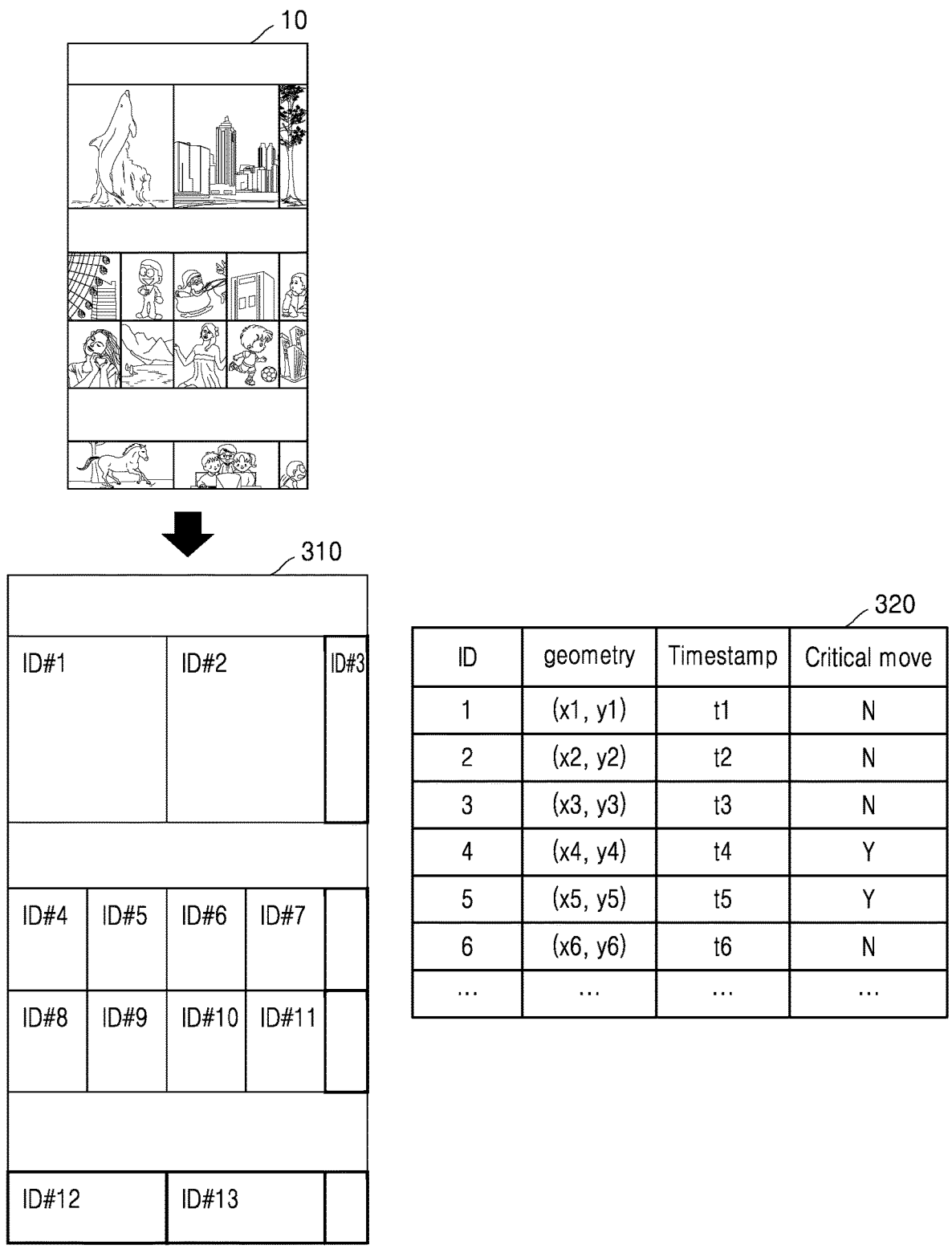
FIG. 3 is a diagram illustrating an example of object information according to various embodiments.

FIG. 3 is a diagram illustrating an example of object information according various embodiments.

The mobile device 200 according to an embodiment may obtain object information about one or more objects included in the first screen 10 output on a display of the mobile device 200. In this case, the one or more objects included in the first screen may be user interface objects which may be targets for a user interaction. For example, the object information may include an object map 310 and an object table 320.

The object map 310 may indicate coordinate information, boundary information, etc., of objects included in the first screen 10, as shown in FIG. 3. As shown in FIG. 3, the object table 320 may include, but is not limited to, identification information of an object (e.g., an object identifier (ID)), position information of the object (e.g., coordinate information), timestamp information of the object, information about whether the object is associated with critical movement, etc.

The mobile device 200 according to an embodiment may obtain object information by analyzing a framework of an application execution screen when the first screen 10 being currently output on the mobile device 200 is the application execution screen. The mobile device 200 may obtain the object information by analyzing rendering information, etc., regarding a web page, when the first screen 10 is a web page screen. The mobile device 200 may obtain the object information through computer vision analysis of the first screen 10 being currently output, etc. However, the disclosure is not limited thereto, and the mobile device 10 may obtain the object information in various manners.

The mobile device 200 may determine whether the object is associated with critical movement. For example, when certain contents are executed or a page is moved or changed through a user interaction with the object, the object may be determined to be associated with critical movement. For example, when the certain contents corresponding to the object are executed through a user interaction to select the object, the object may be determined to be associated with critical movement with respect to a user's selection input. When a page changeover operation or a screen changeover operation occurs through a user interaction to move an indicator with an object located on a boundary of the screen, the object may be determined to be associated with critical movement.

On the other hand, as a user interaction to move an indicator between objects does not cause a content execution operation, a page changeover operation, etc., a corresponding object may be determined not to be associated with critical movement.

Timestamp information of an object according to an embodiment may refer, for example, to information about a time at which the object is displayed on a screen. For example, objects displayed on an identical screen may include identical timestamp information. The timestamp information of an object may also be used to identify an object for which an interaction occurs and to determine whether the interaction for the object is valid, between the mobile device 200 (a source device) and the display device 100 (a sink device).

The mobile device 200 according to an embodiment may transmit the obtained object information to the display device 100 that is a sink device. For example, upon execution of the mirroring function, the mobile device 200 may transmit object information regarding the first screen being currently output on the mobile device 200 to the display device 100. The mobile device 200 may transmit the object information regarding the first screen, together with mirroring information (mirroring data) regarding the first screen.

Upon receipt of an object information request from the display device 100, the mobile device 200 may transmit the object information regarding the first screen to the display device 100.

Referring back to FIG. 2, the display device 100 may receive a control signal for moving the indicator displayed on the mirroring screen (the second screen) in operation S230. For example, to move the indicator, the user may perform an input to press any one of four direction keys of the control device 50, an input to drag in a particular direction on a touch pad of the control device 50, an action to incline or move the control device 50 in a particular direction, etc., and the control device 50 may transmit a control signal including user interaction information to the display device 100.

The display device 100 according to an embodiment may control movement of the indicator based on the object information and the received control signal from the control device, in operation S240.

The display device 100 may obtain navigation map information based on the object information received from the mobile device 200. The navigation map information will be described in greater detail below with reference to FIG. 4.

Figure 4:
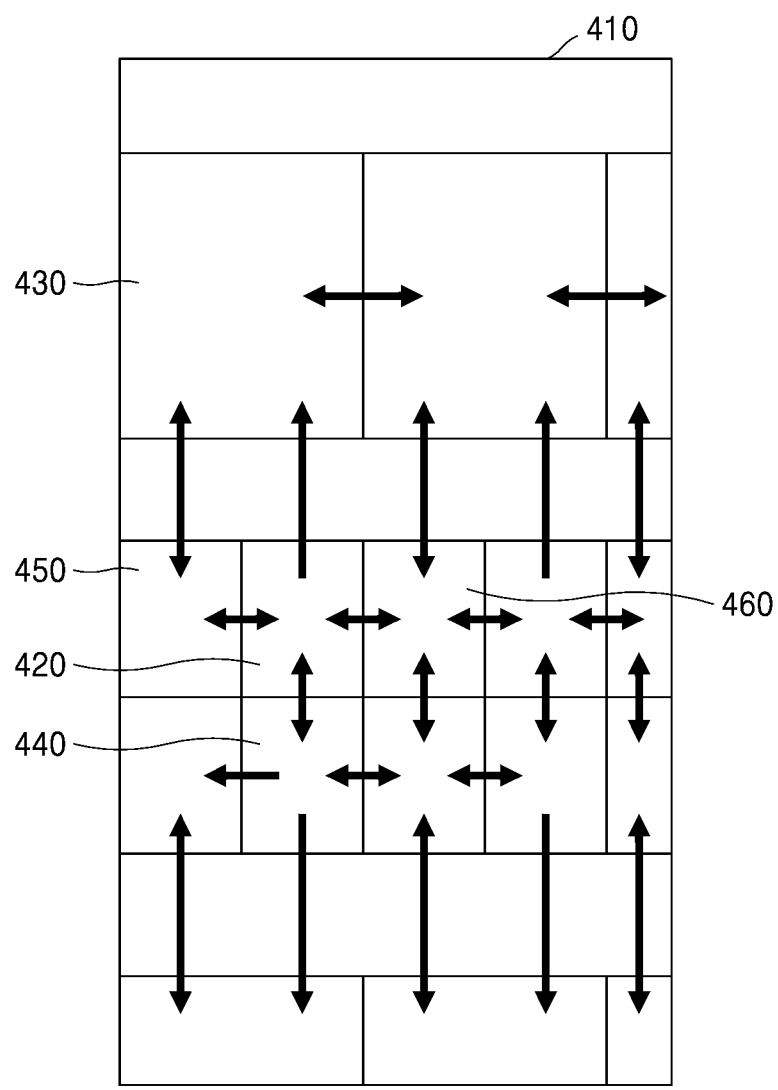
FIG. 4 is a diagram illustrating example navigation map information according to various embodiments.

FIG. 4 is a diagram illustrating an example navigation map information according to various embodiments.

Referring to FIG. 4, navigation map information 410 may include a map defining a target object regarding a four-direction input of each of objects included in the second screen. For example, the navigation map information 410 may define that when the indicator is located in the first object 420, with respect to a first object 420, upon receipt of an upward input, the indicator may be moved to a second object 430; upon receipt of a downward input, the indicator may be moved to a third object 440; upon receipt of a left input, the indicator may be moved to a fourth object 450; and upon receipt of a right input, the indicator may be moved to a fifth object 460. In the same manner, for each of objects included in the second screen, a target object to which an indicator is to be moved in response to a four-direction input may be defined. The navigation map information 410 may also be referred to as four-direction map information.

The display device 100 according to an embodiment may control movement of the indicator between the objects based on the navigation map information, upon receipt of the four-direction input from the control device.

Figure 5:
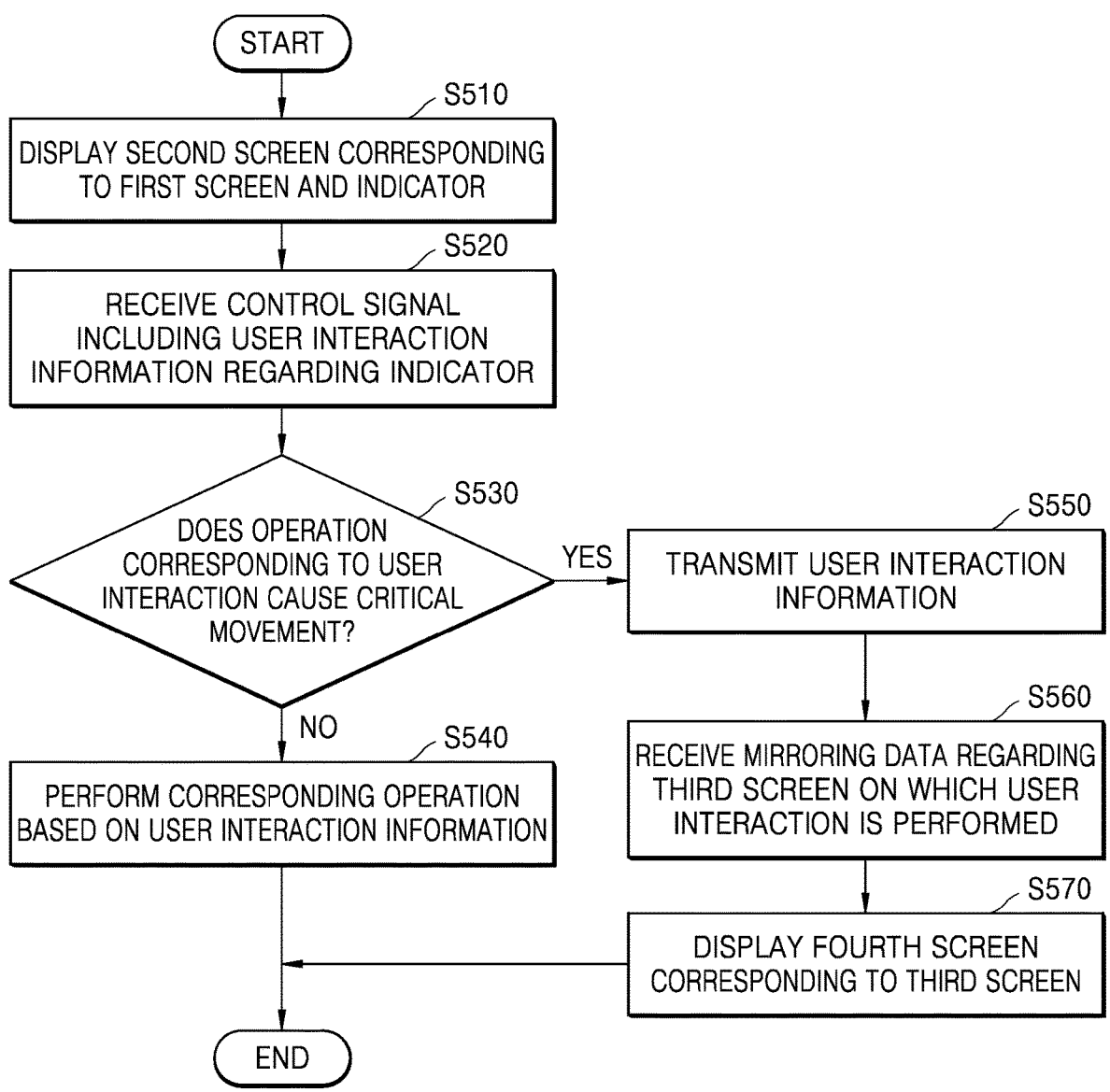
FIG. 5 is a flowchart illustrating an example method of operating a display device according to various embodiments.

FIG. 5 is a flowchart illustrating an example method of operating a display device according to various embodiments.

Referring to FIG. 5, the display device 100 according to an embodiment may mirror the first screen output on the mobile device 200 to display the second screen corresponding to the first screen and may display the indicator on the second screen, in operation S510. Operation S510 may correspond to operation S210 of FIG. 2, and thus a detailed description thereof may not be repeated here.

The display device 100 according to an embodiment may receive a control signal including user interaction information regarding the indicator, in operation S520.

For example, the user interaction information may include, but is not limited to, a user input to move the indicator, an input to select an object on which the indicator is located, etc.

The display device 100 according to an embodiment may determine whether an operation corresponding to a user interaction included in the control signal causes critical movement, in operation S530.

For example, as a user interaction to select an object on which the indicator is currently located causes an operation in which particular contents corresponding to the object are executed, the user interaction may be determined to cause critical movement. A user interaction to move the indicator to an object located in a boundary of the screen may cause the page changeover operation, and thus may be determined to cause critical movement. On the other hand, a user interaction to move the indicator to an object not located in the boundary of the screen may move the indicator without causing the page changeover operation, and thus may be determined not to cause critical movement. However, the disclosure is not limited to this example.

When an operation corresponding to the user interaction does not cause critical movement ("No" in operation S530), the display device 100 may perform the operation corresponding to the user interaction, in operation S540.

For example, for a user interaction to move the indicator from a first object on which the indicator is currently located to a second object not located in the boundary of the screen, the display device 100 may move the indicator from the first object to the second object and display the indicator on the second object.

On the other hand, when an operation corresponding to the user interaction causes critical movement ("Yes" in operation S530), the display device 100 may transmit user interaction information to the mobile device 200, in operation S550.

For example, for a user interaction to move the indicator from the first object on which the indicator is currently located to a third object located in the boundary of the screen, the display device 100 may transmit user interaction information for moving the indicator to the third object to the mobile device 200. The display device 100 may transmit timestamp information regarding the third object to the mobile device 200. The mobile device 200 may perform a page changeover operation corresponding to a user input to move the indicator to the third object, based on the received user interaction information. For example, the mobile device 200 may search an object map or an object table based on timestamp information and coordinate information regarding the third object, thereby identifying the third object. The mobile device 200 may compare the timestamp information of the third object with timestamp information of a mirroring screen being currently transmitted to the display device 100 and determine whether the user input to move the indicator to the third object is valid. When the third object is not included in the mirroring screen being currently transmitted to the display device 100, the mobile device 200 may not perform an operation corresponding to the interaction (e.g., the page changeover operation).

On the other hand, when the third object is included in the mirroring screen being currently transmitted to the display device 100, the mobile device 200 may perform the operation corresponding to the interaction (e.g., the page changeover operation).

The mobile device 200 may output a third screen including the changed page on the display of the mobile device 200 and transmit mirroring data corresponding to the third screen to the display device 100. The display device 100 may receive the mirroring data in operation S560, and output a fourth screen corresponding to the third screen and display the changed page on the fourth screen based on the mirroring information in operation S570.

When the display device 100 according to an embodiment receives the control signal including the user interaction information in operation S520, the display device 100 may identify a connection state of a network connecting the display device 100 with the mobile device 200 and may determine whether the operation corresponding to the user interaction causes critical movement when the connection state of the network is not good. On the other hand, when the connection state of the network is good, the display device 100 may transmit the user interaction information to the mobile device 200 regardless of whether the operation corresponding to the user interaction causes critical movement.

The display device 100 according to an embodiment may identify a graphic processing unit (GPU) resource state thereof, and when the amount of GPU resources is greater than or equal to a preset value, the display device 100 may determine whether the operation corresponding to the user interaction causes critical movement and determine whether to transmit the user interaction information to the mobile device 200 based on whether the operation causes critical movement. On the other hand, when the amount of GPU resources is less than the preset value, the display device 100 may transmit the user interaction information to the mobile device 200 regardless of whether the operation corresponding to the user interaction causes critical movement.

Figure 6A:
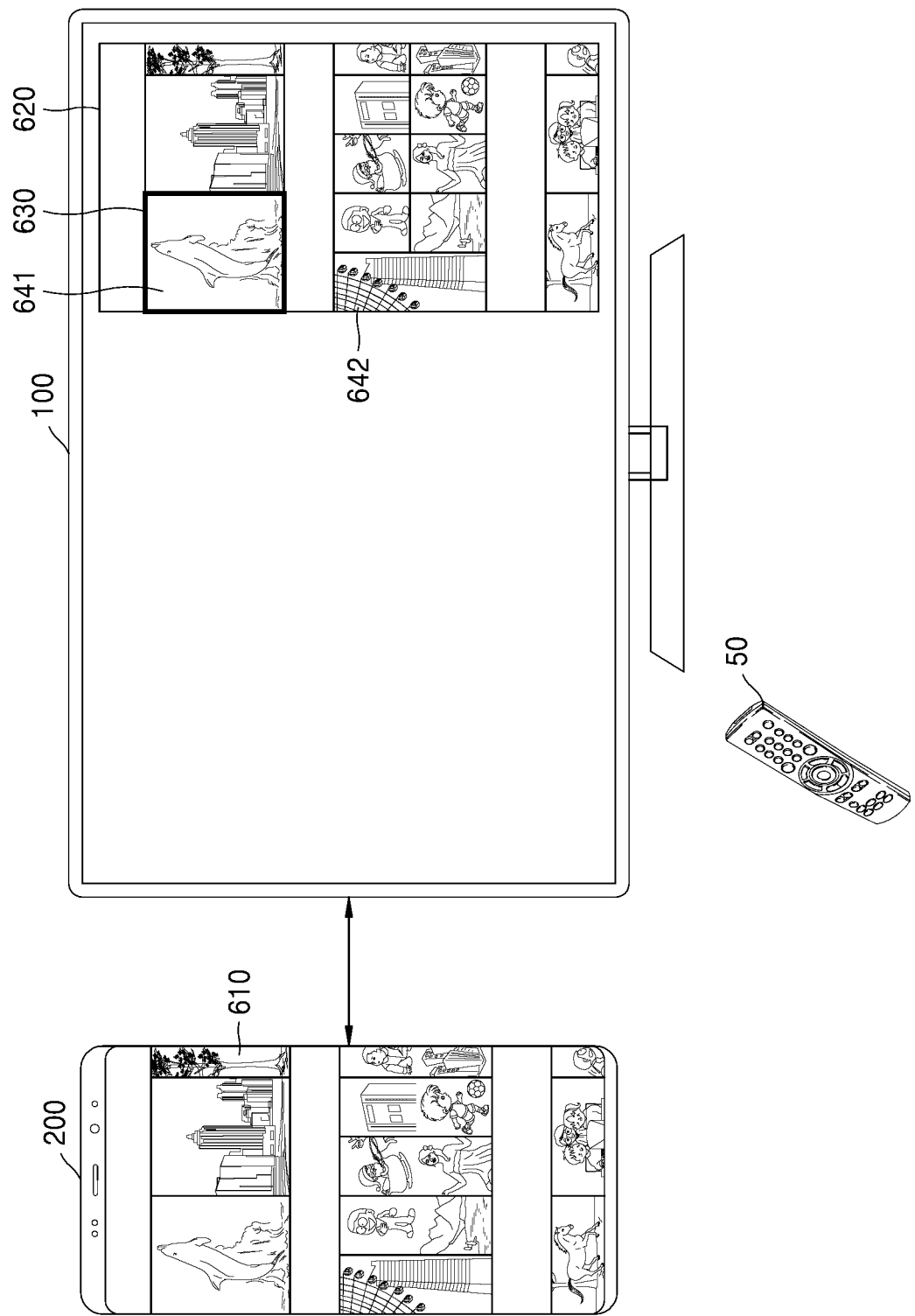
Figure 6B:
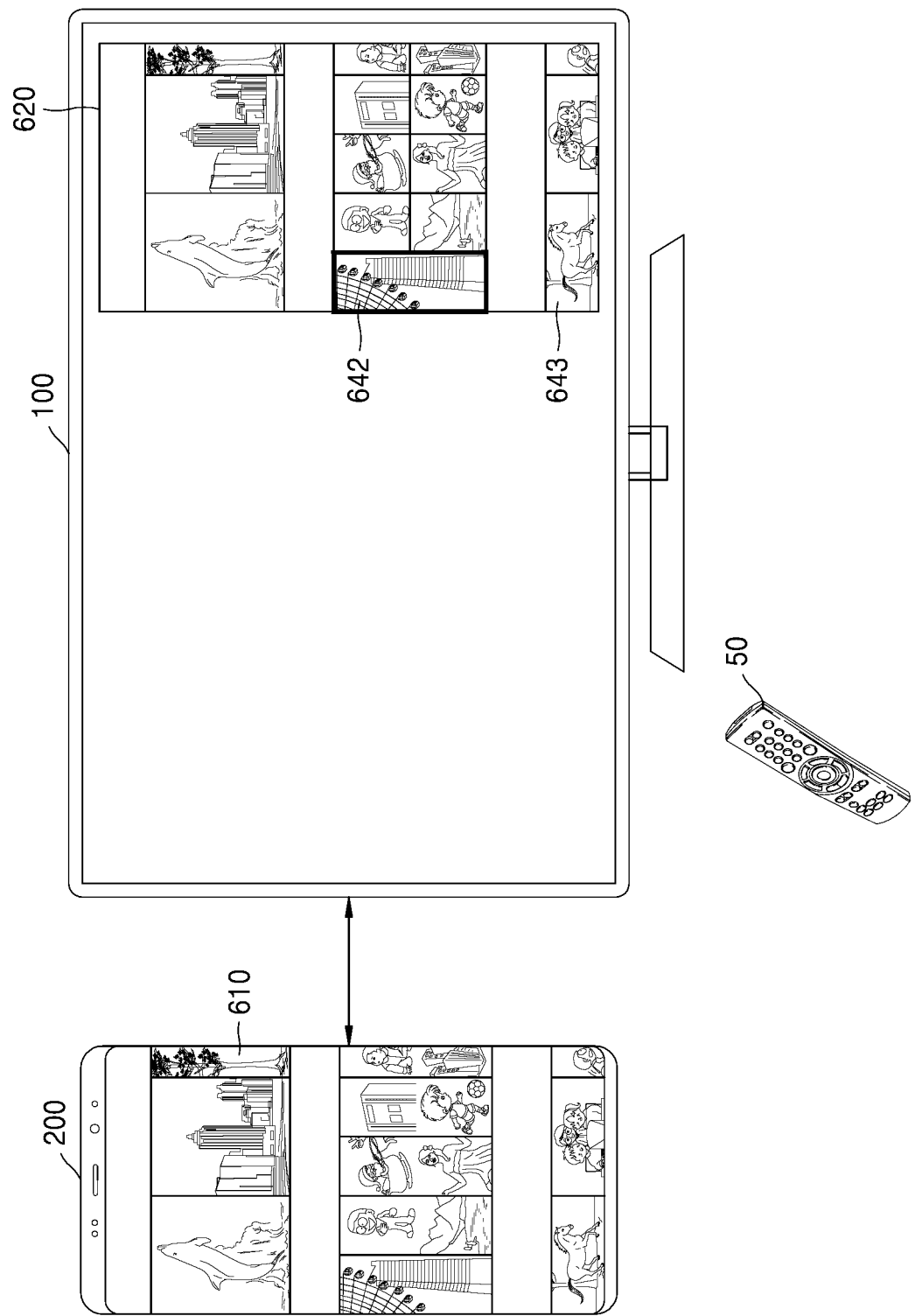

FIGS. 6A, 6B and 6C are diagrams illustrating an example in which an indicator displayed on a display device moves based on a user interaction, in the display device according to various embodiments.

Referring to FIG. 6A, the display device 100 according to an embodiment may mirror a first screen 610 of the mobile device 200 to display a second screen 620 corresponding to the first screen 610.

The second screen 620 may include one or more objects, and the display device 100 may receive object information regarding the one or more objects from the mobile device 200. The object information has been described in detail with reference to FIG. 3 and thus may not be described in detail here.

In addition, the display device 100 may display an indicator 630 on the second screen 620. The display device 100 may display the second screen 620 on the entire region or a smaller region of the display.

When mirroring between the mobile device 200 and the display device 100 starts, the indicator 630 may be displayed in a preset position. For example, an indicator may be displayed on an object positioned first in a left top end of the second screen 620, or the indicator may be displayed in the center of the second screen 620.

The indicator 630 according to an embodiment may, for example, be in the form of a focus or a pointer, and in FIGS. 6A, 6B and 6C, the indicator 630 will be described as being in the form of a focus.

For example, as shown in FIG. 6A, when the indicator 630 is in the form of a focus, an object on which the focus 630 is positioned (a focused object) may be highlighted or an edge of the object on which the focus 630 is positioned may be marked bold. However, the disclosure is not limited thereto, and the display device 100 may be displayed to be distinguished from other objects.

The display device 100 may generate navigation map information based on object information, in which the navigation map information has been described in detail with reference to FIG. 4 and thus may not be described in detail here.

When the display device 100 receives a four-direction input (e.g., a four-direction key input of the control device 50) through the control device 50, the display device 100 may move the focus 630 (change the focused object) based on the navigation map information.

For example, when the display device 100 receives the four-direction key input (e.g., up, down, left, and right direction key inputs) of the control device 50, the display device 100 may move the focus from the currently focused object (object on which the focus is positioned) to an object that adjoins the currently focused object above, under, to the left of, or to the right of the currently focused object.

As shown in FIG. 6A, the display device 100 may receive a control signal corresponding to a user input to press a down key among four-direction keys of the control device 50 from the control device 50.

The display device 100 may identify a target object (a second object 642) to which the focus 630 is to be moved, corresponding to a down input of the currently focused object (a first object 641) based on the navigation map information, and determine based on the object information whether focus movement to the second object 642 causes critical movement.

When focus movement to the second object 642 does not cause critical movement, the display device 100 may move the focus 630 to the second object 642 based on the navigation map information as shown in FIG. 6B.

As shown in FIG. 6B, the display device 100 may receive a control signal corresponding to a user input to press the down key among four-direction keys of the control device 50 from the control device 50 in a state where the focus 630 is positioned on the second object 642 (the second object 642 is focused).

The display device 100 may identify a target object (a third object 643) to which the focus 630 is to be moved, corresponding to a down input of the currently focused second object 642 based on the navigation map information, and determine based on the object information whether focus movement to the third object 643 causes critical movement.

For example, the third object 643 may be positioned in a lower boundary of the second screen 620, a part of the third object 643 may be displayed on the second screen 620, and the other part of the third object 643 and objects below the third object 643 may not be displayed on the second screen 620. Thus, when the focus 630 is moved to the third object 643, the page changeover operation may occur such that the objects below the third object 643 may be displayed.

When focus movement to the third object 643 causes critical movement, the display device 100 may transmit user interaction information included in the control signal to the mobile device 200.

Referring to FIG. 6C, the mobile device 200 may perform an operation corresponding to a user interaction based on the user interaction information received from the display device 100. For example, the mobile device 200 may perform the page changeover operation corresponding to a user input to move the focus 630 to the third object 643.

The mobile device 200 may output a third screen 615 including the changed page on the display of the mobile device 200 and transmit mirroring data corresponding to the third screen 615 to the display device 100. The display device 100 may display a fourth screen 625 corresponding to the third screen 615 based on the received mirroring data. The fourth screen 625 may include the changed page and the display device 100 may position the focus 630 on the third object 643.

Figure 7:
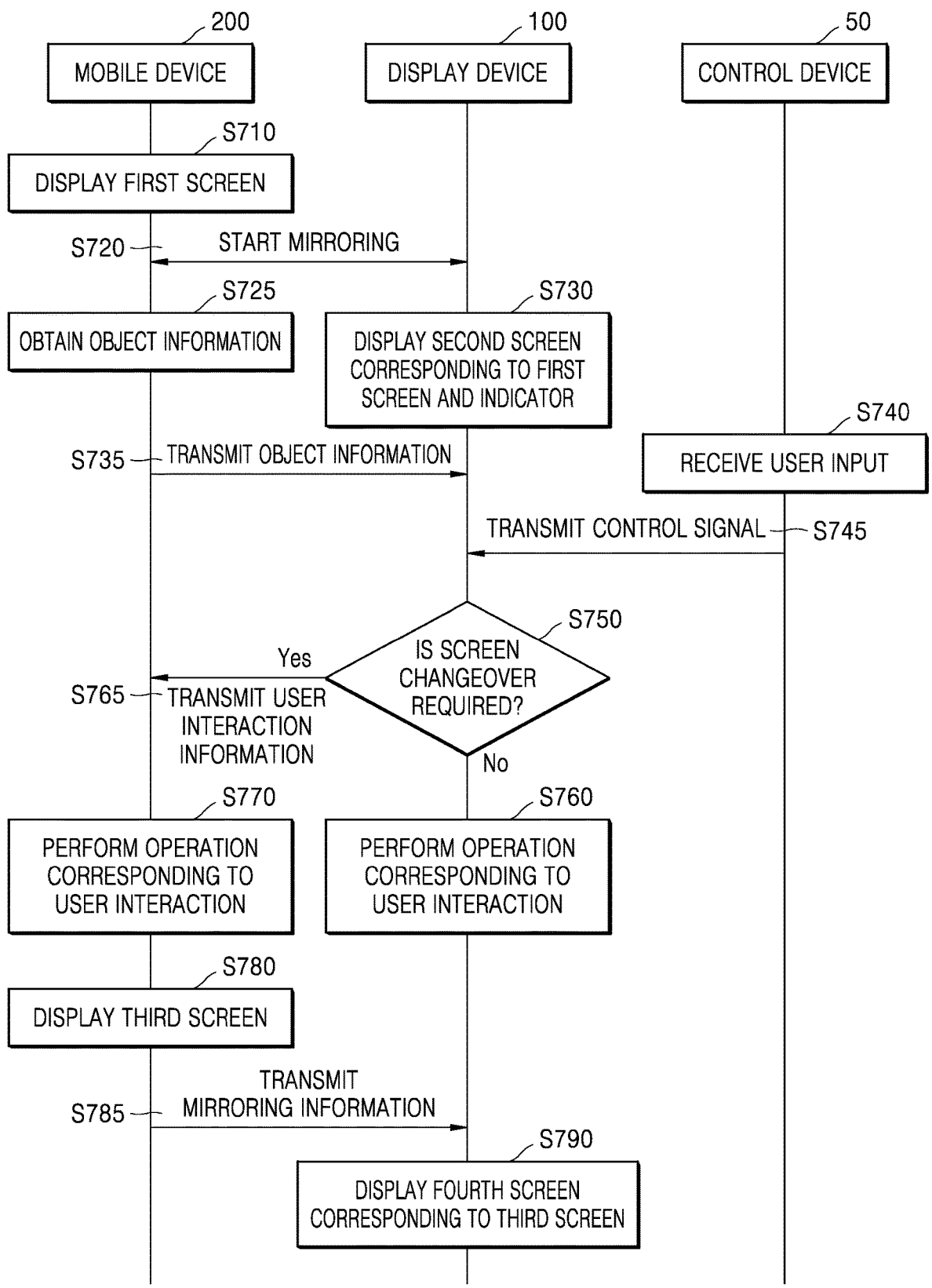
FIG. 7 is a signal flow diagram illustrating an example method of operating a mirroring system according to various embodiments.

FIG. 7 is a signal flow diagram illustrating an example method of operating a mirroring system according to various embodiments.

Referring to FIG. 7, a mirroring system according to an embodiment may include the mobile device 200, the display device 100, and the control device 50, and the display device 100 may mirror a screen output on the mobile device 200.

Referring to FIG. 7, the mobile device 200 according to an embodiment may display a first screen in operation S710. When mirroring starts in operation S720, the mobile device 200 may transmit mirroring information (data) of the first screen to the display device 100. The display device 100 may display a second screen corresponding to the first screen based on the mirroring information of the first screen, and display an indicator on the second screen, in operation S730.

The mobile device 200 according to an embodiment may obtain object information corresponding to the first screen, in operation S725. The mobile device 200 may obtain object information about one or more objects included in the first screen. The object information has been described in detail with reference to FIG. 3 and thus may not be described in detail here.

The mobile device 200 may transmit the obtained object information to the display device 100 in operation S735.

The control device 50 according to an embodiment may receive a user input (user interaction information) in operation S740. For example, the user input may be an input to press four-direction keys included in the control device 50, an input to incline or move the control device 50 in a certain direction, an input to drag on a touch pad included in the control device 50 using a finger, etc., and so forth, without being limited thereto.

Upon receipt of the user input, the control device 50 may transmit a control signal including user interaction information to the display device 100 in operation S745.

The display device 100 may determine whether an operation corresponding to a user interaction included in the control signal requires screen changeover, in operation S750.

For example, in response to a user interaction to select an object on which the indicator is currently located, particular contents corresponding to the object need to be executed and a content execution screen needs to be displayed, such that the user interaction may be determined to be an operation requiring screen changeover. In addition, in response to a user interaction to move an indicator to an object located in a boundary of the screen, a page is changed and the screen including the changed page needs to be displayed, such that the user interaction may be determined to be an operation requiring screen changeover. On the other hand, in response to a user interaction to move an indicator to an object not located in the boundary of the screen, the page is not changed and thus the indicator is moved and displayed without screen changeover, such that the user interaction may be determined to be an operation not requiring screen changeover.

When an operation corresponding to the user interaction does not require screen changeover ("No" in operation S750), the display device 100 may perform the operation corresponding to the user interaction, in operation S760. In this case, even when the operation corresponding the user interaction is performed, screen changeover does not occur.

When the operation corresponding to the user interaction requires screen changeover ("Yes" in operation S750), the display device 100 may transmit user interaction information to the mobile device 200, in operation S765.

The mobile device 200 may perform the operation corresponding to the user interaction in operation S770, such that a screen displayed on the mobile device 200 may be changed from the first screen to the third screen in operation S780.

The mobile device 200 may transmit mirroring information (data) corresponding to the third screen to the display device 100 in operation S785, and the display device 100 may display a fourth screen corresponding to the third screen based on the mirroring data in operation S790.

Figure 8:
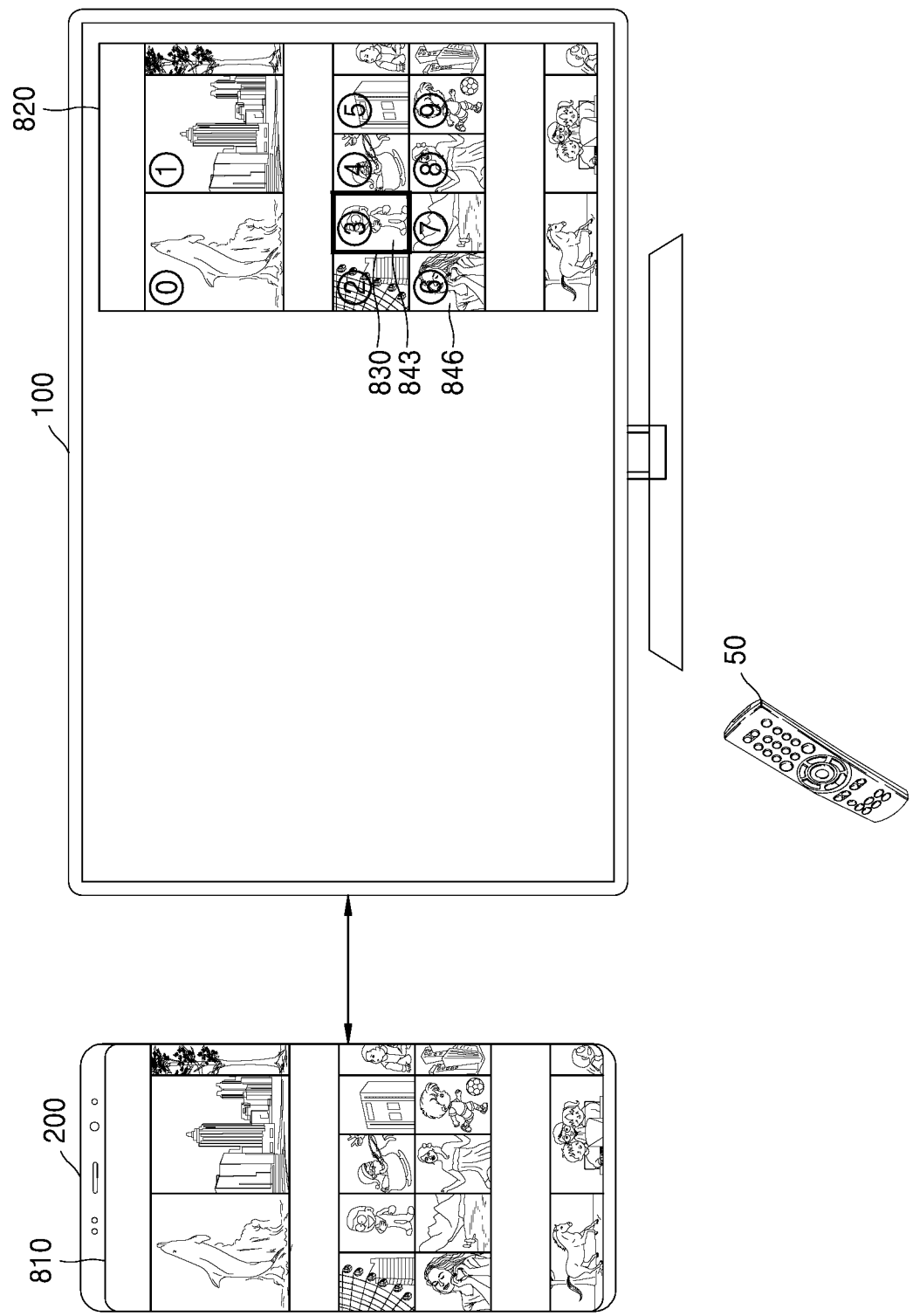
FIG. 8 is a diagram illustrating an example in which a display device displays a second screen according to various embodiments.

FIG. 8 is a diagram illustrating an example in which a display device displays a second screen according to various embodiments.

Referring to FIG. 8, the display device 100 according to an embodiment may mirror a first screen 810 of the mobile device 200 to display a second screen 820 corresponding to the first screen 810. The second screen 820 may include one or more objects, and the display device 100 may receive object information regarding the one or more objects from the mobile device 200. The object information has been described in detail with reference to FIG. 3 and thus may not be described in detail here.

As shown in FIG. 8, the display device 100 may allocate numbers to selectable objects included in the second screen 820 based on the object information, and display the allocated numbers on the corresponding objects.

When the user inputs a number using a numeric key of the control device 50, the display device 100 may move an indicator to an object corresponding to the number. For example, when the user inputs a key corresponding to a number '3' of the control device 50, the display device 100 may move an indicator 830 to an object 843 on which the number '3' is displayed.

When the user inputs a number using a numeric key of the control device 50, the display device 100 may control contents corresponding to an object corresponding to a number to be executed. For example, when the user inputs a key corresponding to a number '6' of the control device 50, the display device 100 may identify an object 846 on which the number '6' is displayed and transmit a request for executing contents corresponding to the object 846 to the mobile device 200. The mobile device 200 may then execute the contents corresponding to the object 846 on which the number '6' is displayed, and display a content execution screen. The display 100 may mirror the content execution screen of the mobile device 200 and display the content execution screen on the display device 100.

Figure 9:
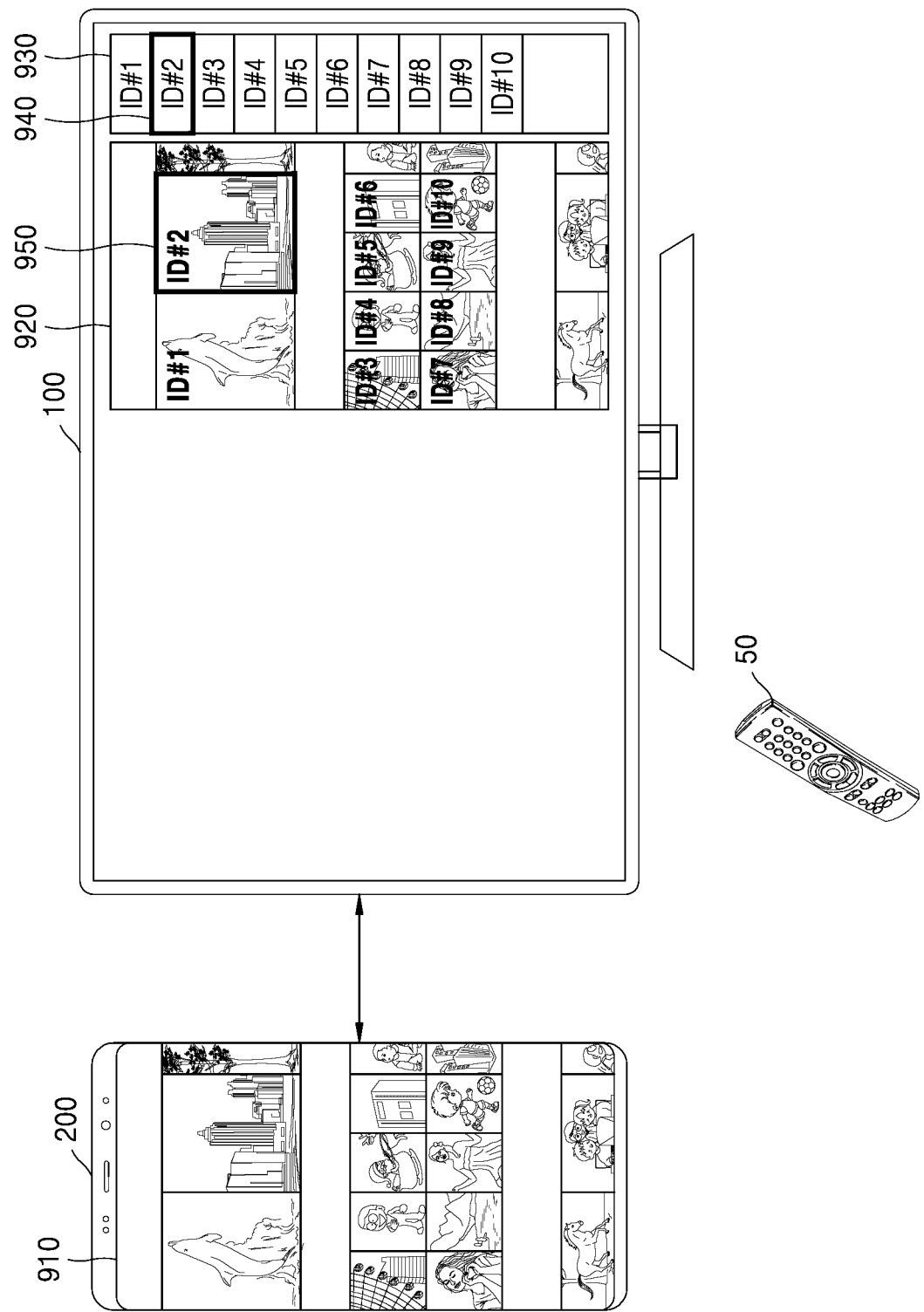
FIG. 9 is a diagram illustrating an example in which a display device displays a second screen according to various embodiments.

FIG. 9 is a diagram illustrating an example in which a display device displays a second screen according to various embodiments.

Referring to FIG. 9, the display device 100 according to an embodiment may mirror a first screen 910 of the mobile device 200 to display a second screen 920 corresponding to the first screen 910. The second screen 920 may include one or more objects, and the display device 100 may receive object information regarding the one or more objects from the mobile device 200. The object information has been described in detail with reference to FIG. 3 and thus may not be described in detail here.

As shown in FIG. 9, the display device 100 may generate an object list 930 of selectable objects included in the second screen 920 based on the object information and display the object list 930.

Referring to FIG. 9, the object list 930 according to an embodiment may be a list of objects movable in two directions. For example, as shown in FIG. 9, the object list 930 may be a list of objects movable in up and down directions. The object list 930 may be a list of objects movable in left and right directions.

The object list 930 may include items respectively corresponding to selectable objects included in the second screen 920 and an indicator (e.g., a focus). A focus 940 displayed on the object list 930 may move between items included in the object list 930 based on a direction key input, a scroll key input, a wheel key input, etc., of the control device 50.

For example, upon receipt of an input of an up-direction key among direction keys of the control device 50, an input to scroll up a scroll key, and an input to rotate a wheel key to the left, the display device 100 may move the focus 940 up in the object list 930. For example, the display device 100 may move the focus 940 from an item on which the focus 940 is currently located to an item adjoining the item on which the focus 940 is currently located, above the item.

On the other hand, upon receipt of an input of a down-direction key among direction keys of the control device 50, an input to scroll down a scroll key, and an input to rotate a wheel key to the right, the display device 100 may move the focus 940 down in the object list 930. For example, the display device 100 may move the focus 940 from the item on which the focus 940 is currently located to an item adjoining the item on which the focus 940 is currently located, under the item.

In addition, the display device 100 may locate a focus 950 on an object ID #2 corresponding to an item ID #2 on which the focus 940 is located, in the object list 930 among objects included in the second screen 920.

When the user selects the item on which the focus 940 is located, using the control device 50, the display device 100 may identify an object corresponding to the item on which the focus 940 is located, and transmit a request for executing contents corresponding to the object to the mobile device 200. The mobile device 200 may then execute the contents corresponding to the object, and display a content execution screen. The display 100 may mirror the content execution screen of the mobile device 200 and display the content execution screen on the display device 100.

FIGS. 10A, 10B, 10C and 10D are diagrams illustrating an example in which an indicator displayed on a display device a moves based on a user interaction, in the display device according to various embodiments.

Referring to FIG. 10A, the display device 100 according to an embodiment may mirror a first screen 1010 of the mobile device 200 to display a second screen 1020 corresponding to the first screen 1010. A second screen 1020 may be displayed on the entire region or a partial region of the display of the display device 100. The second screen 1020 may include one or more objects, and the display device 100 may receive object information regarding the one or more objects from the mobile device 200. The object information has been described in detail with reference to FIG. 3 and thus may not be described in detail here.

In addition, the display device 100 may display an indicator 1030 on the second screen 1020. The indicator 1030 may be in the form of a focus or a pointer (or a cursor), and in FIGS. 10A, 10B, 100 and 10D, the indicator 1030 will be described, by way of non-limiting example, as being in the form of a pointer (or a cursor).

The control device 50 according to an embodiment may operate as a pointing device. For example, the control device 50 may operate as a pointing device upon receipt of a particular key input. When the control device 50 operates as a pointing device, the pointer 1030 may be moved based on a user input to move the control device 50 up, down, to the left, or to the right or incline the control device 50 in a certain direction. For example, the control device 50 may detect movement of the control device 50 and transmit movement information about the detected movement of the control device 50 to the display device 100. The display device 100 may calculate coordinates of the pointer 1030 based on the movement information of the control device 50 and move the pointer 1030 on the screen to correspond to the calculated coordinates.

The control device 50 according to an embodiment may include a touch pad, and in this case, the display device 100 may move the pointer 1030 on the screen according to a displacement value of a subject such as a user's finger moving on the touch pad.

The control device 50 according to an embodiment may include four direction keys and may move the pointer 1030 on the screen in a direction and by a distance corresponding to a four-direction key input, based on the four-direction key input.

The display device 100 may determine selectable objects included in the second screen based on the object information. The display device 100 may display a selectable object to be distinguished from a non-selectable object. For example, the display device 100 may mark an outline of a selectable object with a dotted line or a bold line or may display the selectable object in a different color, without being limited thereto. By displaying a selectable object distinguishably from a non-selectable object, the user may easily identify the selectable object on the second screen.

The display device 100 may move the pointer 1030 based on object information, upon receipt of a control signal including user interaction information from the control device 50. For example, when the user enters an input to move the pointer 1030 to the right using the control device 50, the display device 100 may move the pointer 1030 to the right based on a user input. When the pointer 1030 approaches a selectable second object 1042 as the pointer 1030 is moved to the right, the display device 100 may determine based on the object information whether pointer movement to the second object 1042 causes critical movement.

Figure 10B:
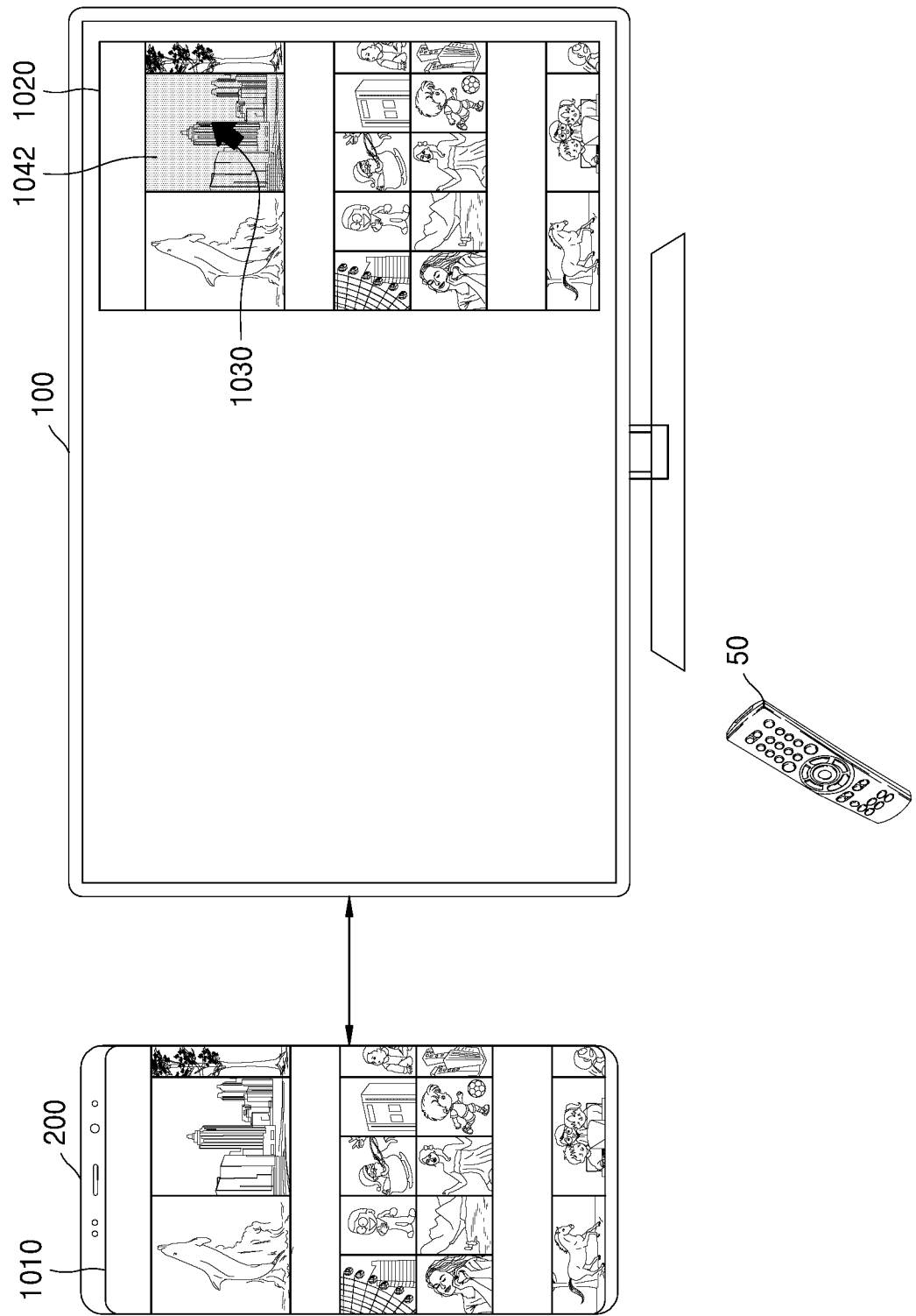
Figure 10C:
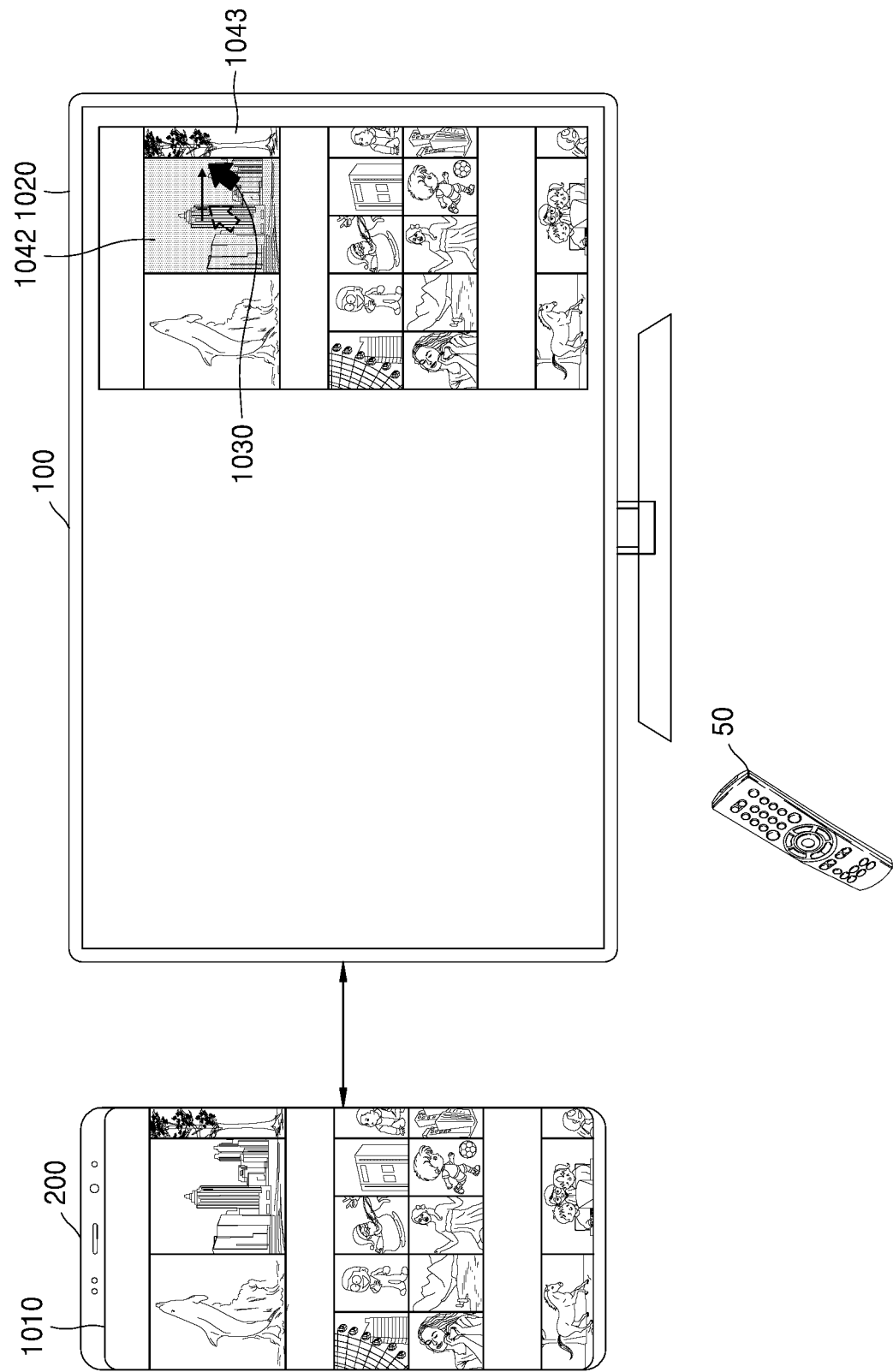

When pointer movement to the second object 1042 does not cause critical movement, the display device 100 may increase a moving speed of the pointer 1030 to move the pointer 1030 such that the pointer 1030 is located on the selectable second object 1042, as shown in FIG. 10B. For example, when a distance between the pointer 1030 and the selectable second object 1042 is less than a threshold distance, the pointer 1030 may be moved as if the pointer 1030 sticks to the center of the selectable second object 1042 like a magnet.

When the user continues entering the input to move the pointer 1030 to the right using the control device 50 in a state where the pointer 1030 is located in the center of the second object 1042, the display device 100 may move the pointer 1030 to the right based on a user input, as shown in FIG. 100. When the pointer 1030 approaches a selectable third object 1043 as the pointer 1030 is moved to the right, the display device 100 may determine based on the object information whether pointer movement to the third object 1043 causes critical movement.

When pointer movement to the third object 1043 causes critical movement, the display device 100 may transmit user interaction information included in the control signal to the mobile device 200.

The mobile device 200 may perform an operation corresponding to a user interaction based on the user interaction information received from the display device 100. For example, the mobile device 200 may output a third screen 1015 in which the page currently displayed on the first screen 1010 is changed to the next page as illustrated in FIG. 10D.

The display device 100 may output a fourth screen 1025 corresponding to the third screen 1015 (a screen including the next page) displayed on the mobile device 200 by mirroring the third screen 1015, and the fourth screen 1025 may be a screen displaying the next page. The display device 100 may locate the pointer 1030 on the third object 1043.

Figure 11A:
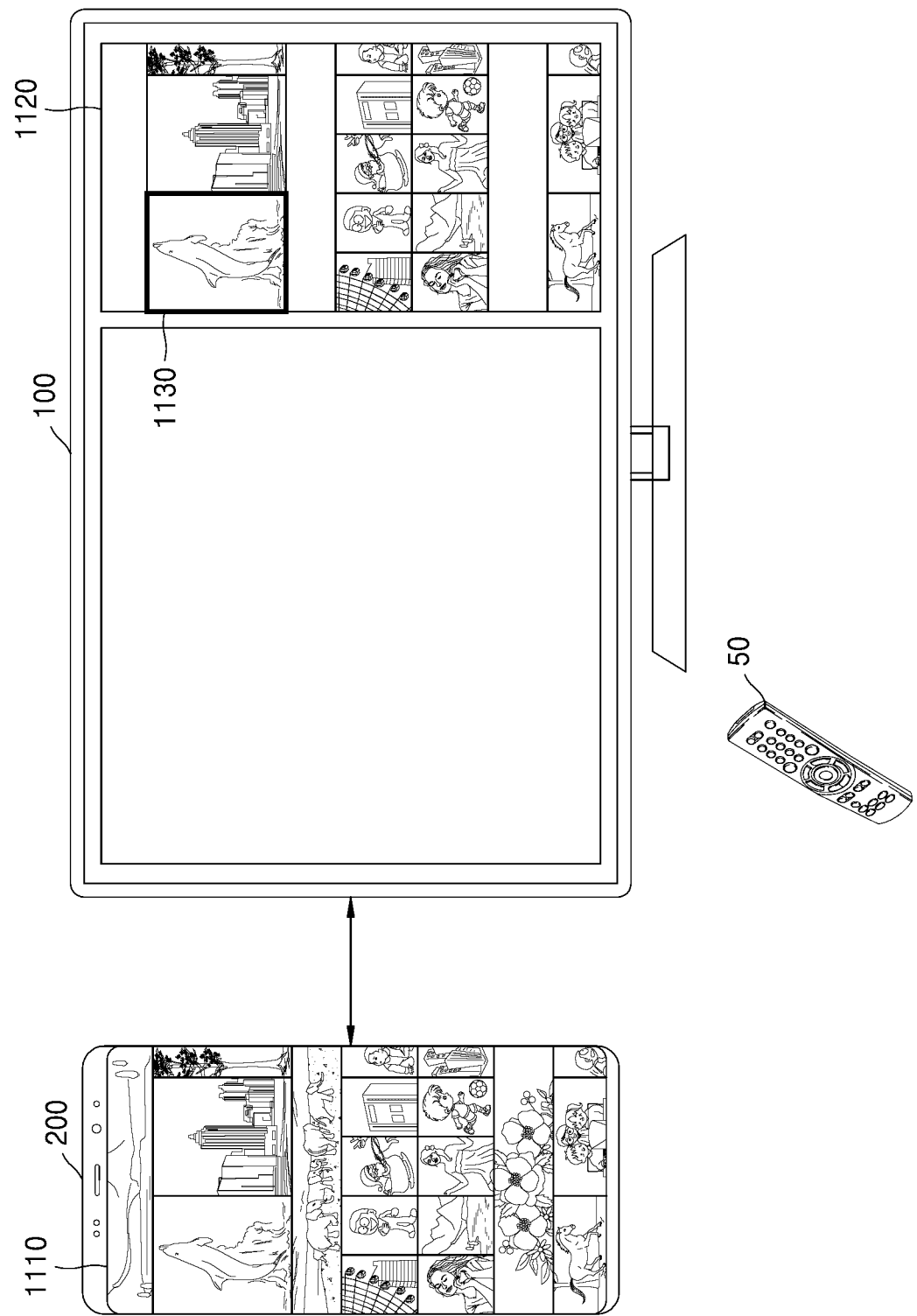
FIGS. 11A and 11B are diagrams illustrating an example in which a display device mirrors a screen of a mobile device according to various embodiments.
Figure 11B:
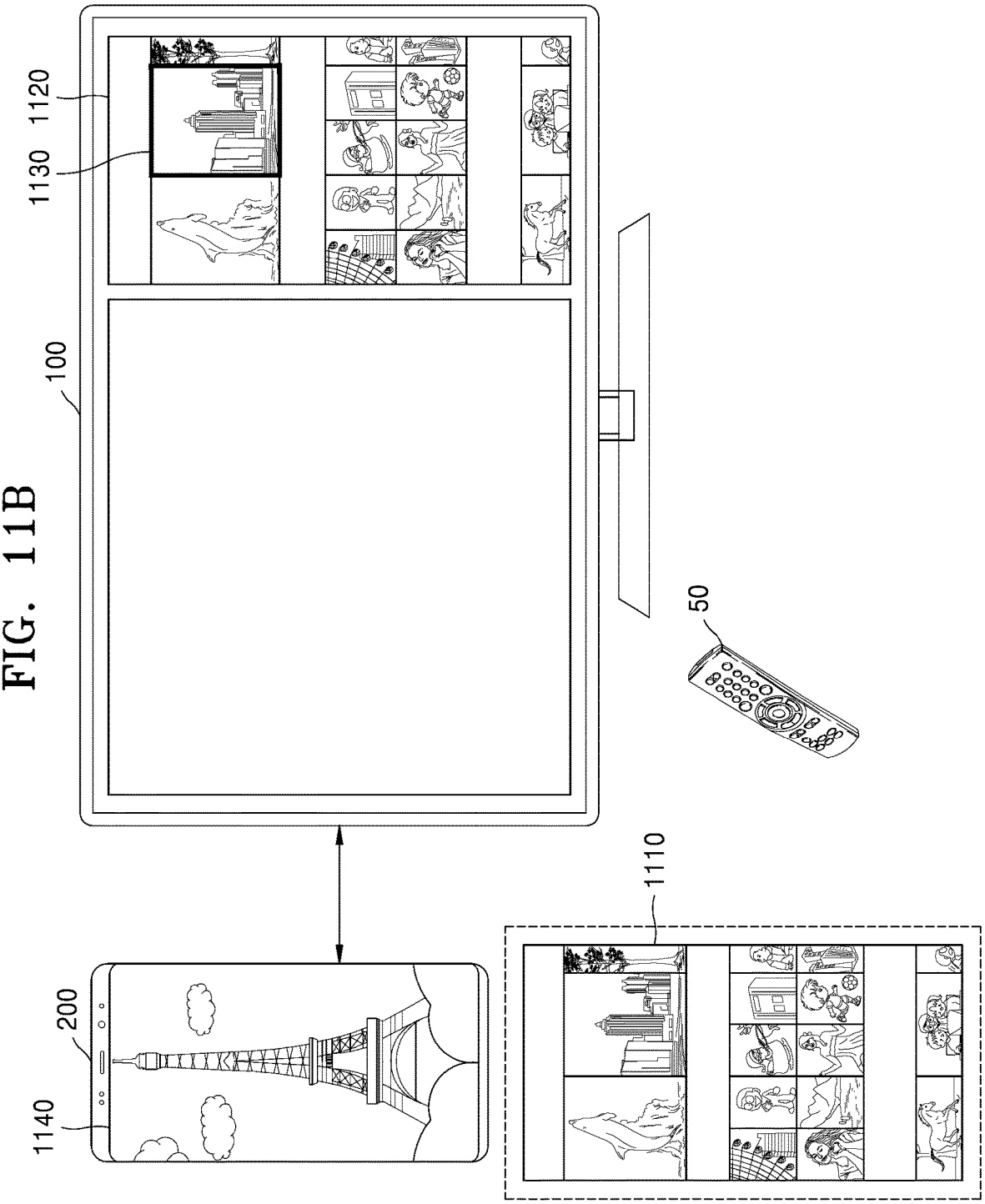

FIGS. 11A and 11B are diagrams illustrating an example in which a display device mirrors a screen of a mobile device according to various embodiments.

Referring to FIG. 11A, the mobile device 200 according to an embodiment may execute a first task and display a first window corresponding to execution of the first task on a display of the mobile device 200. For example, the mobile device 200 may execute a first application and display a first application execution window 1110 (hereinafter, a first execution window) on the display. Upon input of a request for mirroring with the display device 100 during execution of the first task by the mobile device 200, the display device 100 may display a screen 1120 corresponding to the first execution window 1110 by mirroring the first execution window 1110. On the screen 1120 displayed on the display of the display device 100, an indicator 1130 may be displayed as shown in and described with reference to FIG. 6A. In FIG. 11A, the indicator 1130 will be described by way of non-limiting example as being in a focus form.

The mobile device 200 according to an embodiment may perform multi-tasking. For example, the mobile device 200 may further perform a second task while executing the first task. The mobile device 200 may perform the most recently starting task in a foreground environment, and may perform a previously performed task in a background environment. For example, the mobile device 200 may perform the first task in the background environment and the second task in the foreground environment.

As shown in FIG. 11B, the mobile device 200 may output a second window 1140 corresponding to the second task executed in the foreground environment on the display and may output or may not output the first window 1110 corresponding to the first task performed in the background environment, in the form of a floating window on the display. FIG. 11B illustrates an example in which the first window 1110 corresponding to the first task is not displayed on the display.

In this case, even when the mobile device 200 further performs the second task, the display device 100 may display the first window 1110 corresponding to the first task continuously performed in the background environment by mirroring the first window 1110.

The display device 100 may receive object information corresponding to the first window 1110 from the mobile device 200. The display device 100 may generate navigation map information based on object information, in which the navigation map information has been described in detail with reference to FIG. 4 and thus may not be described in detail here.

The display device 100 may receive a control signal including user interaction information from the control device 50. For example, the display device 100 may receive a four-direction key input of the control device 50, and may move the focus 1130 based on navigation map information upon receipt of the four-direction key input.

For example, when the display device 100 receives the four-direction key input (e.g., up, down, left, and right direction key inputs), the display device 100 may move the focus from the currently focused object to an object that adjoins the currently focused object above, under, to the left of, or to the right of the currently focused object.

The display device 100 may identify a target object to which the focus 1130 is to be moved, based on navigation map information, and determine based on the object information whether focus movement to the target object causes critical movement.

When focus movement to the target object does not cause critical movement, the display device 100 may move the focus 1130 to the target object based on the navigation map information.

On the other hand, when focus movement to the target object causes critical movement, the display device 100 may transmit user interaction information to the mobile device 200. The mobile device 200 may perform an operation corresponding to a user interaction on a first window corresponding to a first task being currently executed in the background environment, based on the user interaction information received from the display device 100.

The mobile device 200 may transmit mirroring data of the first window 1110 on which the operation corresponding to the user interaction is performed to the display device 100 which may then display a screen on which the operation corresponding to the user interaction is performed, based on the mirroring data of the display device 100.

The mobile device 200 according to an embodiment may change a window to be mirrored on the display device 100, upon receipt of a request for changing a mirroring window. For example, upon receipt of a request for mirroring the second window 1140 during mirroring of the first window 1110 corresponding to the first task being executed in the background environment, the second window 1140 corresponding to the second task being currently executed in the foreground environment may be mirrored on the display device 100. The display device 100 may output a screen corresponding to the second window 1140 by mirroring the second window 1140 of the mobile device 200.

FIGS. 12A, 12B, 12C and 12D are diagrams illustrating an example in which an indicator displayed on a display device moves based on a user interaction, in the display device according to various embodiments.

Figure 12A:
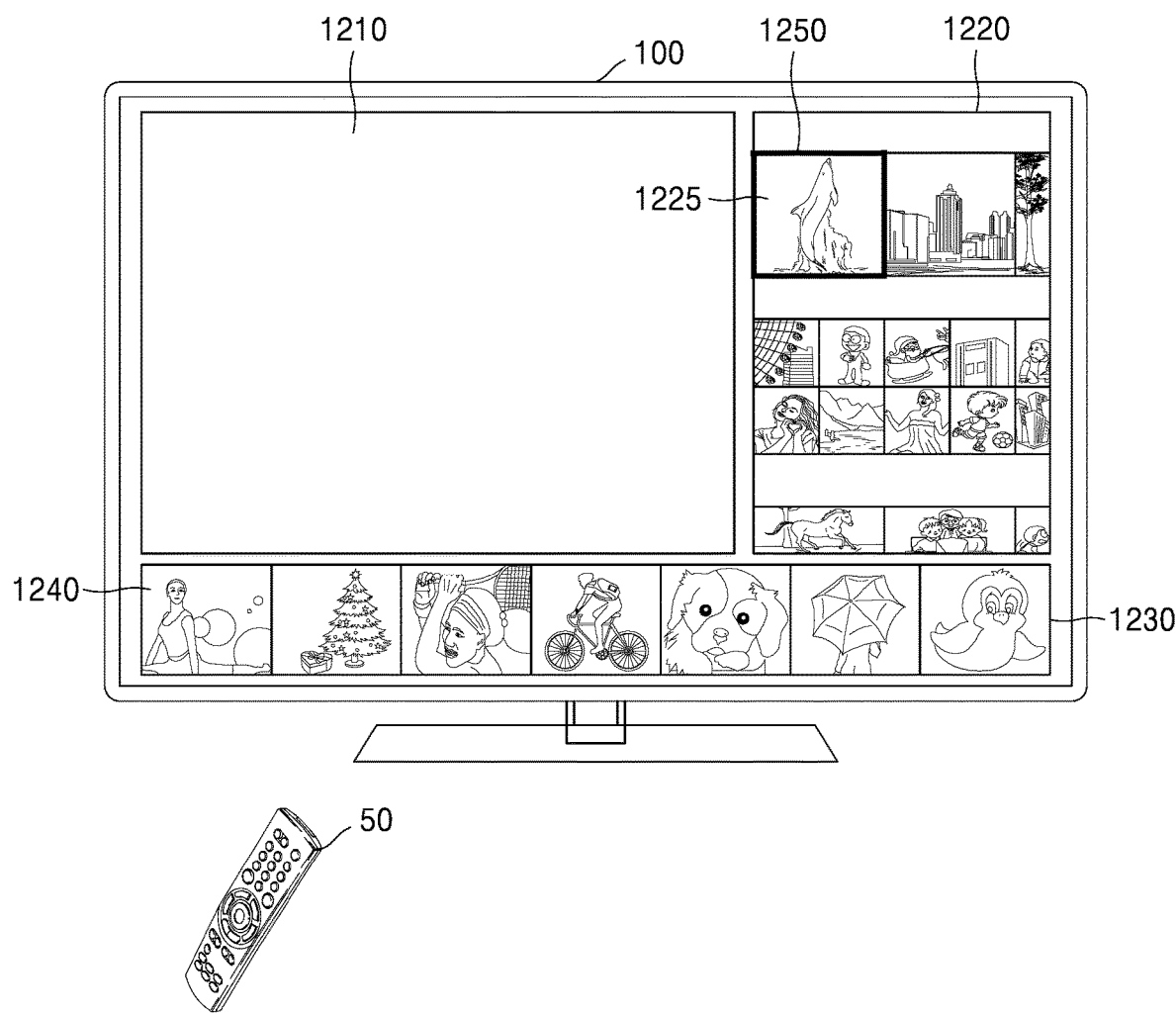
FIGS. 12A, 12B, 12C and 12D are diagrams illustrating an example in which an indicator displayed on a display device moves based on a user interaction, in the display device according to various embodiments.

Referring to FIG. 12A, the display of the display device 100 according to an embodiment may be divided into a first region 1210, a second region 1220, and a third region 1230. On the first region 1210, broadcasting contents being currently played on the display device 100 may be output, without being limited thereto. On the second region 1220, a second screen mirroring a first screen of the mobile device 200 may be displayed. On the third region 1230, a menu list 1240 provided in the display device 100 may be displayed. The menu list 1240 may include a plurality of menu items.

The display device 100 according to an embodiment may display an indicator 1250. The indicator 1250 may be in the form of a focus or a pointer (or a cursor), and in FIGS. 12A, 12B, 12C and 12D, the indicator 1250 will be described by way of non-limiting example as being in the form of a focus.

For example, as shown in FIG. 12A, the focus 1250 may be located on any one of objects included in the second screen. The object on which the focus 1250 is located may be highlighted or an outline of the object may be displayed boldly, without being limited thereto, and the object on which the focus 1250 is located may be displayed distinguishably from other objects.

The object on which the focus 1250 is located 1225 may be an object located in the leftmost top end of the second screen. Thus, an object adjoining the object above or to the left of the object may not exist.

Figure 12B:
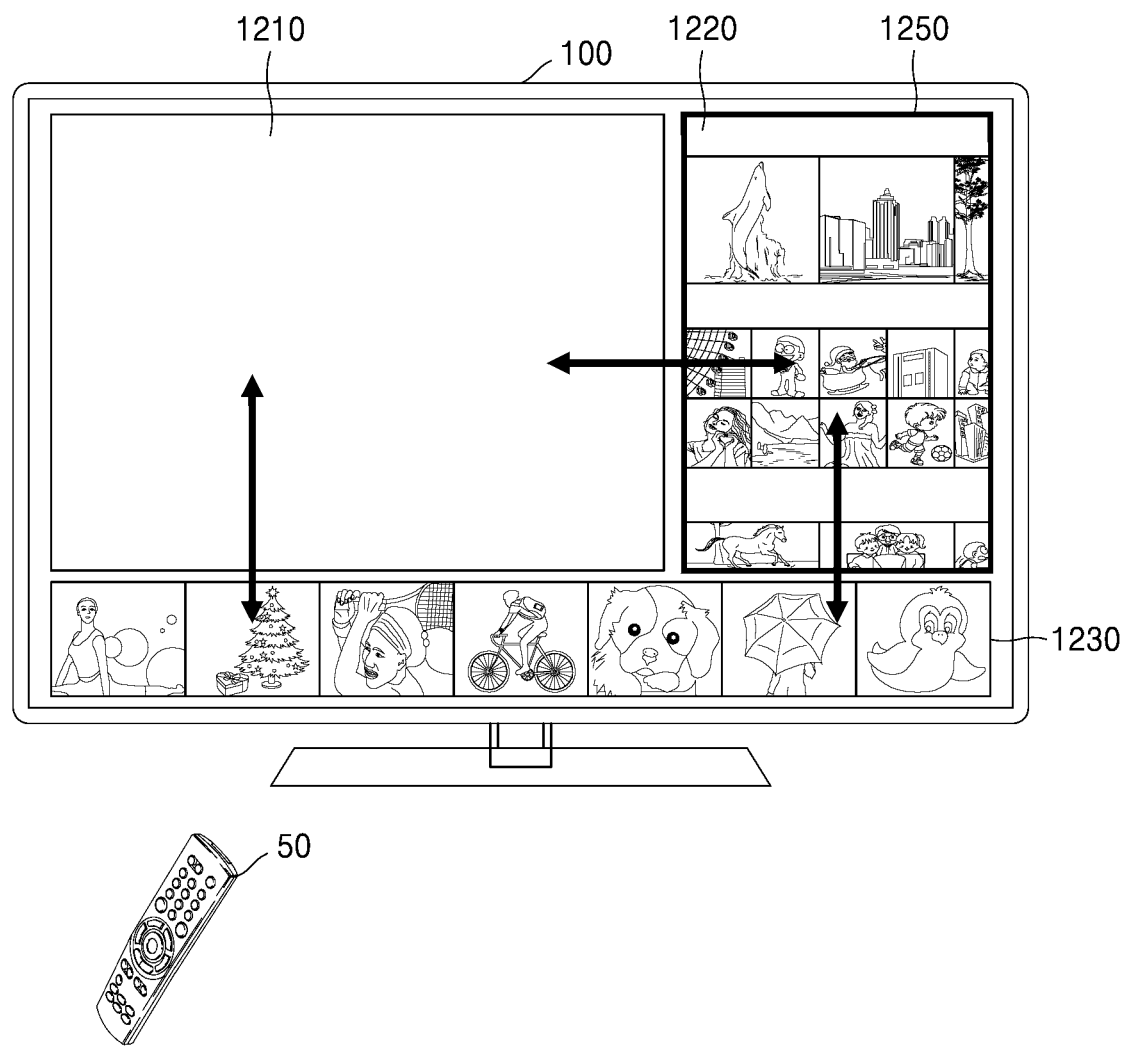

The display device 100 may receive a control signal corresponding to a user input to press an up key or a left key among four-direction keys of the control device 50 from the control device 50. In the absence of an object adjacent up or to the left of a currently focused object 1225, the display device 100 may control the focus 1250 to be located on the entire second region 1220 as shown in FIG. 12B.

Upon receipt of a signal to input a back button of the control device 50 from the user, the display device 100 may control the focus 1250 to be located on the entire second region 1220 regardless of existence or absence of an object adjacent to the currently focused object.

When the focus 1250 is located on the entire second region 1220, the second region 1220 may be highlighted or an outline of the second region 1220 may be displayed boldly, without being limited thereto.

When the focus 1250 is located on the second region 1220, focus movement may occur among the first region 1210, the second region 1220, and the third region 1230 through a four-direction key input of the control device 50. For example, upon receipt of a control signal to input a left key among four-direction keys of the control device 50 from the user in a state where the focus 1250 is located on the second region 1220, the display device 100 may move the focus 1250 to the first region 1210. When the focus 1250 is moved to the first region 1210, the first region 1210 may be highlighted or an outline of the first region 1210 may be displayed boldly.

Figure 12C:
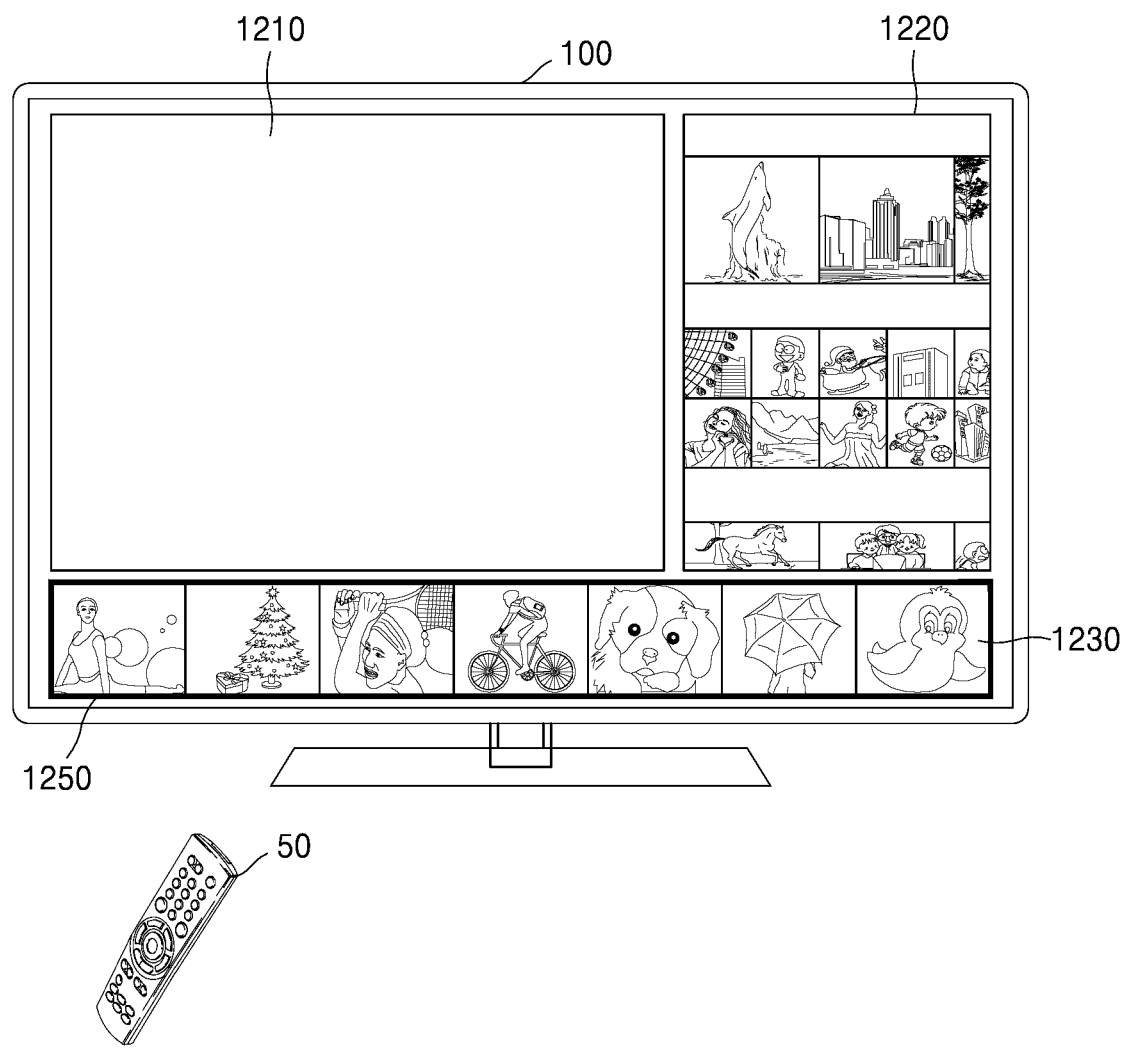

For example, upon receipt of a control signal to input a down key among the four-direction keys of the control device 50 from the user in a state where the focus 1250 is located on the second region 1220, the display device 100 may move the focus 1250 to the third region 1230. When the focus 1250 is moved to the third region 1230, the third region 1230 may be highlighted or an outline of the third region 1230 may be displayed boldly as shown in FIG. 12C.

Figure 12D:
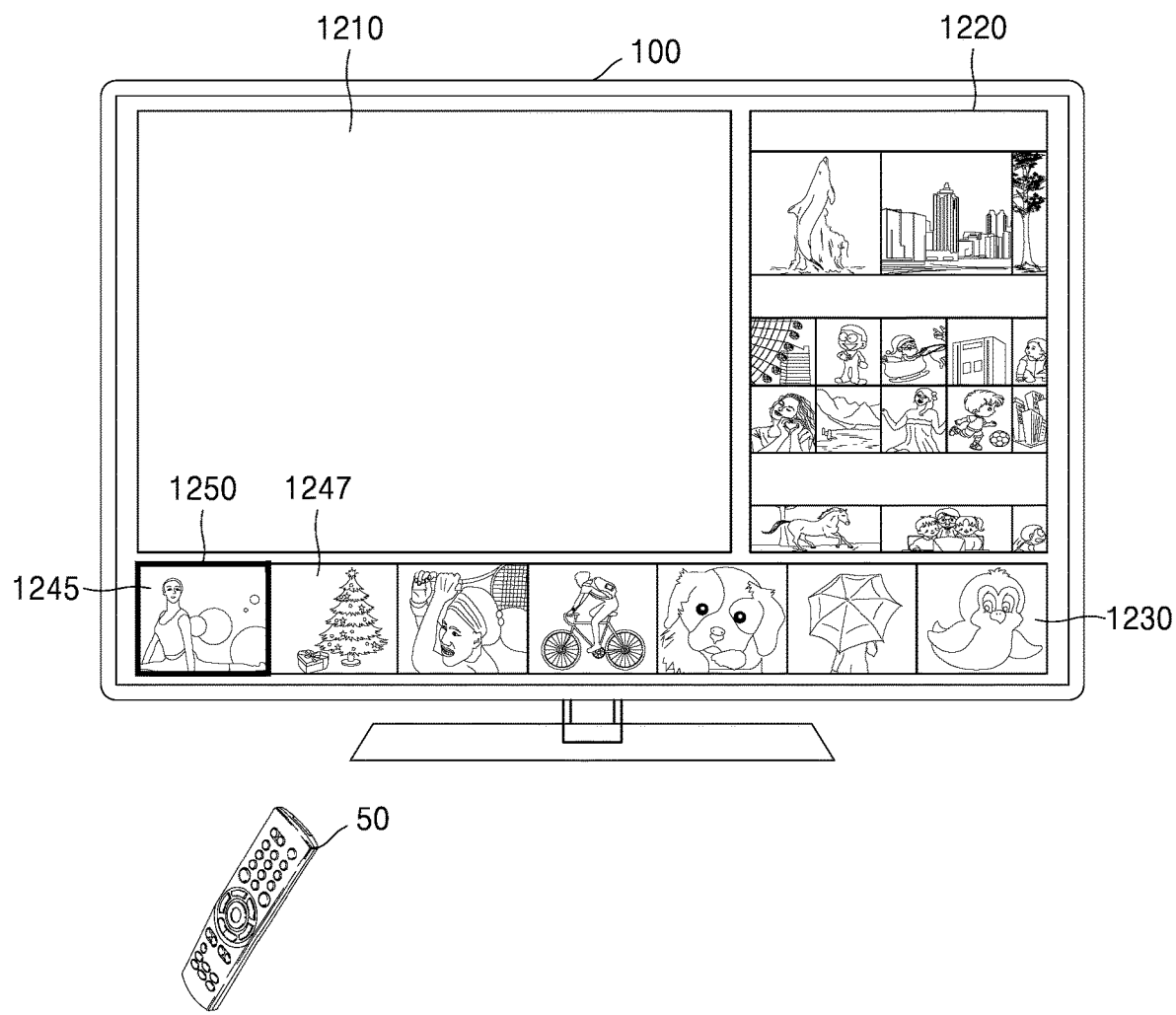

Upon receipt of a control signal to input a confirmation button of the control device 50 from the user in a state where the focus 1250 is located on the third region 1230, the display device 100 may position the focus 1250 on any one of a plurality of menu items included in the menu list 1240 displayed on the third region 1230, as shown in FIG. 12D. In this case, the focus 1250 may be located on a first menu item 1245 which is located first among the plurality of menu items, without being limited thereto. When the focus 1250 is located on a menu item included in the menu list 1240, focus movement may occur among menu items through a four-direction key input of the control device 50.

For example, upon receipt of a control signal to input a right key among the four-direction keys of the control device 50 from the user in a state where the focus 1250 is located on the first menu item 1245, the display device 100 may move the focus 1250 to a second menu item 1247 adjacent to the right of the first menu item 1245. When the focus 1250 is moved to the second menu item 1247, the second menu item 1247 may be highlighted or an outline of the second menu item 1247 may be displayed boldly.

Figure 13:
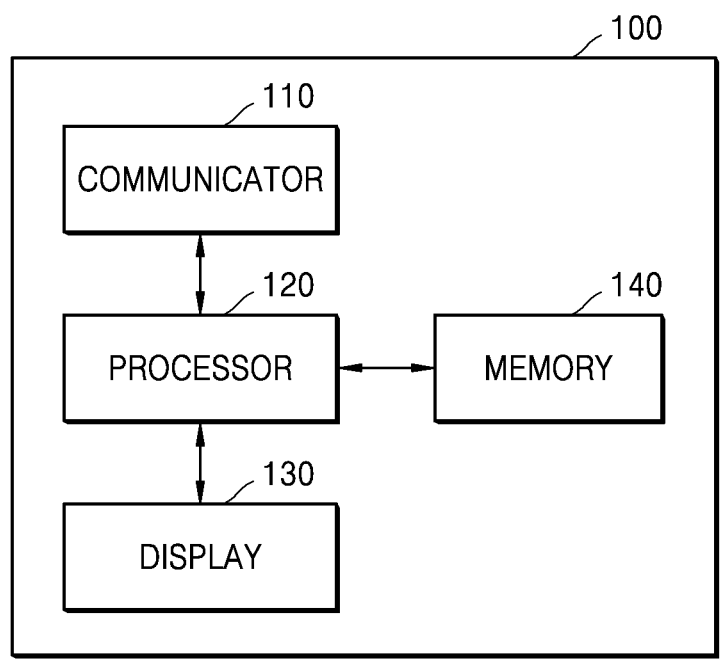
FIG. 13 is a block diagram illustrating an example configuration of a display device according to various embodiments.

FIG. 13 is a block diagram illustrating an example configuration of a display device according to various embodiments.

Referring to FIG. 13, the display device 100 according to an embodiment may include a communicator (e.g., including communication circuitry) 110, a processor (e.g., including processing circuitry) 120, a display 130, and a memory 140.

The communicator 110 according to an embodiment may include various communication circuitry and transmit and receive data or a signal from an external device or an external server under control of the processor 120. According to an embodiment, the communicator 110 may communicate with the mobile device 200 via a wired/wireless network.

The communicator 110 may transmit and receive data or a signal using at least one of a local area network (LAN), a wide area network (WAN), a wireless LAN (WLAN) (for example, Wireless Fidelity (Wi-Fi), WiFi Direct, etc.) Bluetooth, wired Ethernet, infrared (IR), Bluetooth Low Energy (BLE), ultrasonic waves, or ZigBee. Herein, the communicator 110 may include at least one communication module capable of transmitting and receiving data according to communication standards corresponding to an LAN, a WAN, a WLAN (for example, Wi-Fi, WiFi Direct, etc.) Bluetooth, wired Ethernet, IR, BLE, ultrasonic waves, and ZigBee.

The communicator 110 may include a short-range communication module including various communication circuitry capable of receiving a control signal from the control device 50, e.g., an IR communication module, etc. In this case, the communicator 110 may receive a control signal from the control device 50.

The communicator 110 according to an embodiment may receive mirroring information (mirroring data) and object information corresponding to a mirroring screen from the mobile device 200 when the display device 100 mirrors a screen output on the mobile device 200. The communicator 110 may receive the control signal from the control device 50 and transmit user interaction information included in the control signal to the mobile device 200.

The processor 120 according to an embodiment may include various processing circuitry and control the display device 100 overall. The processor 120 may control other components included in the display device 100 to perform a certain operation.

The processor 120 according to an embodiment may execute one or more programs stored in the memory 140. The processor 120 may include a single core, a dual core, a triple core, a quad core, and a core of a multiple thereof. The processor 120 may also include a plurality of processors.

The memory 140 according to an embodiment may store various data, programs, or applications for driving and controlling the display device 100.

The programs stored in the memory 140 may include one or more instructions. The programs (for example, one or more instructions) or applications stored in the memory 140 may be executed by the processor 120.

The processor 120 according to an embodiment may control the second screen corresponding to the first screen output on the mobile device 200, based on mirroring data received from the mobile device 200. The processor 120 may obtain navigation map information based on the object information received from the mobile device 200. The processor 120 may move the indicator on the screen, based on the navigation map information, upon receipt of a user input to move the indicator from the control device 50.

Upon receipt of a control signal including user interaction information from the control device 50, the processor 120 may determine whether to transmit the user interaction information included in the control signal to the mobile device 200 based on whether an operation corresponding to a user interaction causes critical movement, whether the operation corresponding to the user interaction needs screen changeover, etc. When the operation corresponding to the user interaction does not cause critical movement and does not require screen changeover, the processor 120 may perform the operation corresponding to the user interaction. For example, a GPU included in the processor 120 may calculate an attribute value such as coordinates, a form, a size, a color, etc., corresponding to the indicator according to a layout of the screen based on the user interaction. However, the disclosure is not limited to this example.

The display 130 according to an embodiment may convert an image signal, a data signal, an on-screen display (OSD) signal, a control signal, or the like, processed by the processor 120, to generate a driving signal. The display 130 may be implemented with a PDP, an LCD, an OLED, a flexible display, or the like, and may also be implemented with a three-dimensional (3D) display. The display 130 may include a touch screen and thus may be used as an input device as well as an output device.

The display 130 according to an embodiment may display a second screen corresponding to the first screen displayed on the mobile device 200. The display 130 may also display an indicator on the second screen. The display 130 may move the indicator based on the user interaction and display the indicator.

Figure 14:
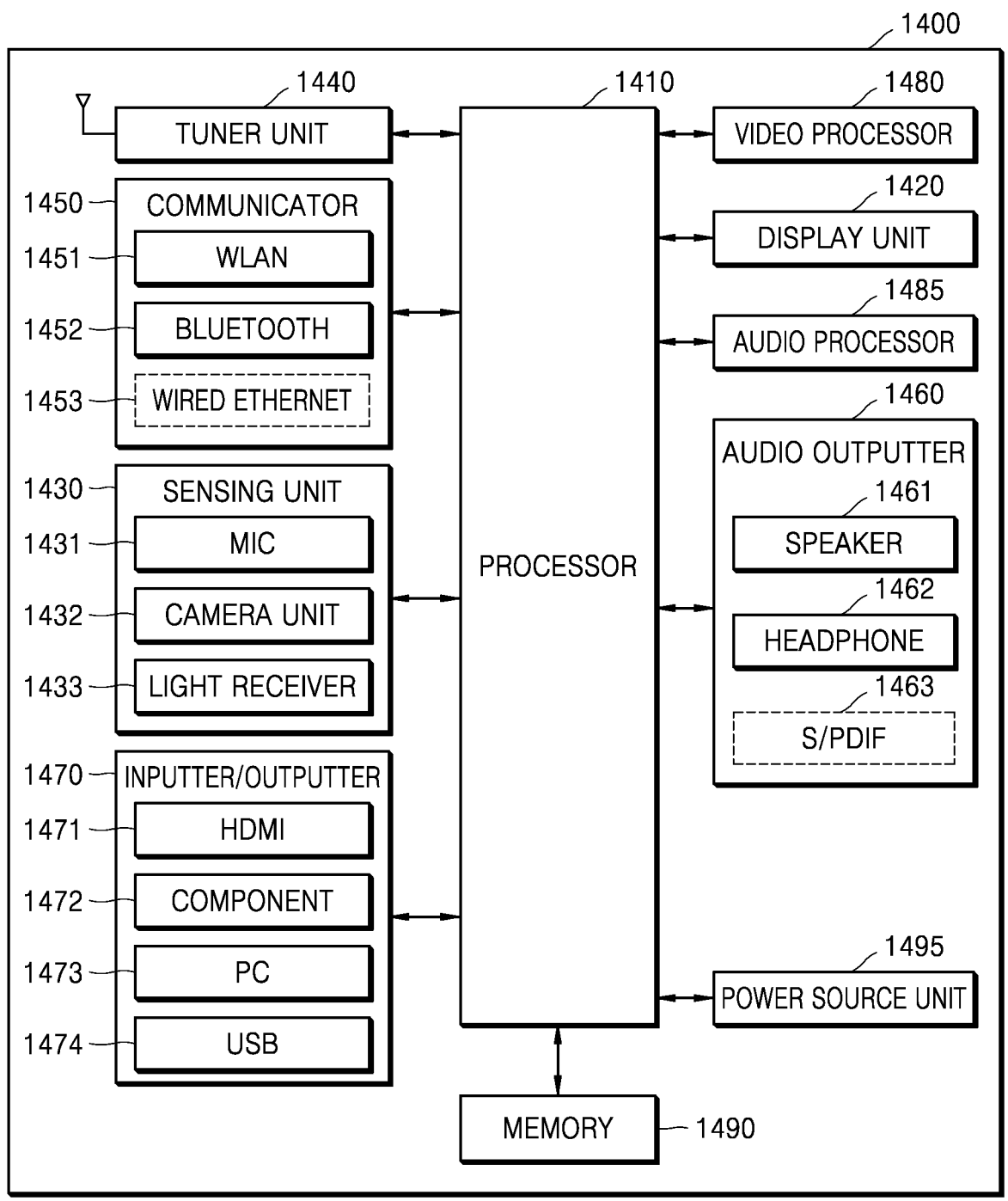
FIG. 14 is a block diagram illustrating an example configuration of a display device according to various embodiments.

FIG. 14 is a block diagram illustrating an example configuration of a display device according to various embodiments.

A display device 1400 of FIG. 14 may be an embodiment of the display device 100 described with reference to FIGS. 1 and 13.

Referring to FIG. 14, the display device 1400 according to an embodiment may include a tuner unit (e.g., including a tuner) 1440, a processor (e.g., including processing circuitry) 1410, a display unit (e.g., including a display) 1420, a communicator (e.g., including communication circuitry) 1450, a sensing unit (e.g., including at least one sensor) 1430, an inputter/outputter (e.g., including input/output circuitry) 1470, a video processor (e.g., including video processing circuitry) 1480, an audio processor (e.g., including audio processing circuitry) 1485, an audio outputter (e.g., including audio output circuitry) 1460, a memory 1490, and a power source unit (e.g., including a power supply) 1495.

The communicator 1450 of FIG. 14 may correspond to the communicator 110 of FIG. 13, the processor 1410 of FIG. 14 may correspond to the processor 120 of FIG. 13, the display unit 1420 of FIG. 14 may correspond to the display 130 of FIG. 13, and the memory 1490 of FIG. 14 may correspond to the memory 140 of FIG. 13, respectively, and thus the same description may not be repeated here.

The tuner unit 1440 according to an embodiment may include a tuner and select a frequency of a channel the electronic device 1400 is to receive from among many electric wave components by tuning the frequency through amplification, mixing, resonance, or the like with respect to a broadcasting signal received wiredly or wirelessly. The broadcasting signal may include audio, video, and additional information (for example, an electronic program guide (EPG)).

The tuner unit 1440 may receive a broadcasting signal from various sources such as terrestrial broadcasting, cable broadcasting, satellite broadcasting, Internet broadcasting, and so forth. The tuner unit 1440 may receive a broadcasting signal from a source such as analog broadcasting, digital broadcasting, or the like.

The communicator 1450 according to an embodiment may include various communication circuitry and transmit and receive data or a signal from an external device or a server under control of the processor 1410. The processor 1410 may transmit/receive contents to/from an external device connected through the communicator 1450, download an application from the external device, or browse the web.

The communicator 1450 may include a module combination including various communication circuitry in any one or two or more of a WLAN 1451, Bluetooth 1452, and wired Ethernet 1453.

The video processor 1480 may include various video processing circuitry and perform processing on video data received by the display device 1400. The video processor 1480 may perform various image processing, such as decoding, scaling, noise filtering, frame rate conversion, resolution conversion, etc., with respect to video data.

The sensing unit 1430 may include at least one sensor and sense a user's voice, a user's image, or a user's interaction, and may include, for example, a microphone 1431, a camera unit (e.g., including a camera) 1432, and a light receiver (e.g., including light receiving circuitry) 1433.

The microphone 1431 may receive an uttered voice of the user. The microphone 1431 may convert the received voice into an electric signal and output the electric signal to the processor 1410. The user's voice may include, for example, a voice corresponding to a menu or a function of the display device 1400.

The camera unit 1432 may include a camera and receive an image (e.g., a continuous frame) corresponding to a user's motion including a gesture in a camera recognition range. The processor 1410 may select a menu displayed on the display device 1400 using a recognition result of a received motion or perform control corresponding to the recognition result of the received motion.

A light receiver 1433 may include various light receiving circuitry and receive a light signal (including a control signal) received from an external control device through a lighting window (not shown) of a bezel of the display unit 1420. The light receiver 1433 may receive a light signal corresponding to a user input (e.g., a touch, a press, a touch gesture, a voice, or a motion) from a control device. A control signal may be extracted from the received optical signal under control of the processor 1410.

The inputter/outputter 1470 may include various input/output circuitry and receive video (e.g., moving images, etc.), audio (e.g., a voice, music, etc.), and additional information (e.g., an EPG, etc.) from the outside of the display device 1400, under control of the processor 1410. The inputter/outputter 1470 may include one of an HDMI port 1471, a component jack 1472, a PC port 1473, and a USB port 1474. The inputter/outputter 1470 may include a combination of the HDMI port 1471, the component jack 1472, the PC port 1473, and the USB port 1474.

The processor 1410 may include various processing circuitry and control an overall operation of the display device 1400 and a signal flow among internal elements of the display device 1400, and process data. The processor 1410 may execute an operating system (OS) and various applications stored in the memory 1490, when there is a user input or a preset and stored condition is satisfied.

The processor 1410 may include a random access memory (RAM) that stores a signal or data input from the outside of the display device 1400 or is used as a storage region corresponding to various tasks performed in the display device 1400, a read only memory (ROM) having stored therein a control program for controlling the display device 1400, and a processor.

The processor 1410 may include a graphics processor (not shown). The graphic processor (not shown) may generate a screen including various objects such as an icon, an image, a text, etc., using a calculator (not shown) and a rendering unit (not shown). The calculator may calculate an attribute value such as coordinates, shapes, sizes, colors, etc., of respective objects based on a layout of the screen using the user's input sensed by the sensing unit 1430. The rendering unit may generate a screen of various layouts including an object based on the attribute value calculated by the calculation unit. The screen generated by the rendering unit may be displayed in a display region of the display unit 1420.

The audio processor 1485 may include various audio processing circuitry and process audio data. The audio processor 1485 may perform various processing such as decoding, amplification, noise filtering, etc., on the audio data. The audio processor 1485 may include a plurality of audio processing modules for processing audio corresponding to a plurality of contents.

The audio outputter 1460 may include various audio output circuitry and outputs audio included in a broadcast signal received through the tuner unit 1440 under control of the processor 1410. The audio outputter 1460 may output audio (e.g., voice, sound, etc.) input through the communicator 1450 or the inputter/outputter 1470. The audio outputter 1460 may output audio stored in the memory 1490 under control of the processor 1410. The audio outputter 1460 may include at least one of a speaker 1461, a headphone output terminal 1462, or a Sony/Phillips digital interface (S/PDIF) output terminal 1463. The audio outputter 1460 may include a combination of the speaker 1461, the headphone output terminal 1462, and the S/PDIF output terminal 1463.

The power source unit 1495 may include a power supply and supply power, which is input from an external power source, to the internal elements of the display device 1400, under control of the processor 1410. The power source unit 1495 supplies power, which is output from one or more batteries (not shown) included in the display device 1400, to the internal elements, under control of the processor 1410.

The memory 1490 may store various data, programs, or applications for driving and controlling the display device 1400 under control of the processor 1410. The memory 1490 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs (not shown) of the memory 1490 may be implemented in the form of software to perform a control function of broadcasting reception, a channel control function, a volume control function, a communication control function, a voice recognition function, a motion recognition function, a light reception control function, a power control function, or a power control function of an external device connected wirelessly (e.g., by Bluetooth) in the display device 1400. The processor 1410 may perform respective functions using the foregoing software stored in the memory 1490.

The block diagrams of the display devices 100 and 1400 shown in FIGS. 13 and 14, respectively, may be block diagrams for an embodiment. Elements of the block diagram may be integrated, added, or omitted depending on the specifications of the display devices 100 and 1400 implemented actually. When necessary, two or more elements may be integrated into one element or one element may be divided into two or more elements. A function executed in each element (or module) is intended to describe embodiments, and a detailed operation or apparatus thereof does not limit the scope of the disclosure.

The method of operating the display device according to an embodiment may be random-access implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program commands include a machine language code made by a complier and a high-level language code executable by an interpreter.

The method of operating the display device according to various embodiments may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the display device or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include an S/W program itself, which is transmitted from the server to the client device or the third device or transmitted from the third device to client device.

In this case, one of the server, the client device, and the third device may execute the computer program product to perform the method according to the embodiments. Alternatively, two or more of the server, the client device, and the third device may execute the computer program product to execute the method according to the embodiments in a distributed manner.

For example, a server (e.g., a cloud server or AI server, etc.) may execute a computer program product stored in the server to control the client device communicating with the server to perform the method according to the embodiments.

As the display device according to an embodiment receives the object information corresponding to a mirroring screen and controls movement of the indicator based on the object information and the user interaction, the user watching the mirroring screen displayed on the display device may easily manipulate the mirroring screen using the control device.

The user of the display device according to an embodiment may continuously enjoy the "lean-back experience" without being disturbed, when the user watches the mirroring screen displayed on the display device.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure including the appended claims and their equivalents.

What is claimed is:

1. A display device comprising:
   a display;
   a communicator comprising communication circuitry configured to communicate with a mobile device;
   a memory storing one or more instructions; and
   a processor configured to execute the one or more instructions stored in the memory to:
   based on the display device performing a screen mirroring with respect to a first screen of a mobile device, control the display to display a second screen corresponding to the first screen and an indicator;
   control the communicator to receive object information regarding one or more objects included in the first screen from the mobile device;
   generate navigation map information of the one or more objects based on the object information; and
   in response to an input for moving the indicator, control movement of the indicator based on the navigation map information.

2. The display device of claim 1, wherein the object information comprises at least one of position information of the one or more objects, information about an object adjoining the one or more objects, timestamp information, or information regarding whether the one or more objects are associated with critical movement.

3. The display device of claim 1, wherein the processor is further configured to execute the one or more instructions to: allocate a number to each of the one or more objects included in the second screen and control the display to display the allocated number.

4. The display device of claim 3, wherein the processor is further configured to execute the one or more instructions to: in response to an input for selecting the number, move the indicator to an object to which the selected number is allocated.

5. The display device of claim 1, wherein the processor is further configured to execute the one or more instructions to:
   determine, based on the object information and the navigation map information, whether the input for moving the indicator is regarding an object associated with critical movement; and
   control the communicator to transmit information regarding the input for moving the indicator and the object to the mobile device based on the input for moving the indicator being regarding the object associated with critical movement.

6. The display device of claim 5, wherein the input for moving the indicator being regarding the object associated with critical movement comprises an input for moving the indicator to an object causing a page changeover operation among the one or more objects.

7. The display device of claim 5, wherein the processor is further configured to execute the one or more instructions to: based on a screen of the mobile device being changed from the first screen to a third screen as the mobile device performs an operation corresponding to the information regarding the input for moving the indicator and the object, control the display to display a fourth screen corresponding to the third screen by mirroring the third screen.

8. The display device of claim 5, wherein the processor is further configured to execute the one or more instructions to: perform an operation corresponding to the input for moving the indicator based on the input for moving the indicator being not regarding the object associated with critical movement.

9. A method of operating a display device, the method comprising:
based on the display device performing a screen mirroring with respect to a first screen of a mobile device, displaying a second screen corresponding to the first screen and an indicator;
receiving object information regarding one or more objects included in the first screen from the mobile device;
generating navigation map information of the one or more objects based on the object information; and
in response to an input for moving the indicator, controlling movement of the indicator based on the navigation map information.

10. The method of claim 9, wherein the object information comprises at least one of position information of the one or more objects, information about an object adjoining the one or more objects, timestamp information, or information regarding whether the one or more objects are associated with critical movement.

11. The method of claim 9, further comprising allocating a number to each of the one or more objects included in the second screen and displaying the allocated number.

12. The method of claim 11, wherein the controlling of the movement of the indicator comprises, in response to an input for selecting the number, moving the indicator to an object to which the selected number is allocated.

13. The method of claim 9,
wherein the controlling of the movement of the indicator comprises controlling the movement of the indicator based on a control signal including user interaction information regarding moving the indicator and the navigation map information.

14. The method of claim 13, further comprising:
determining, based on the object information and the navigation map information, whether the input for moving the indicator is regarding an object associated with critical movement; and
transmitting information regarding the input for moving the indicator and the object to the mobile device based on the input for moving the indicator being regarding the object associated with critical movement.

15. The method of claim 14, wherein the input for moving the indicator being regarding the object associated with critical movement comprises an input for moving the indicator to an object that causes a page changeover operation among the one or more objects.

16. The method of claim 14, further comprising displaying a fourth screen corresponding to a third screen by mirroring the third screen based on a screen of the mobile device being changed from the first screen to the third screen as the mobile device performs an operation corresponding to the information regarding the input for moving the indicator and the object.

17. The operating method of claim 14, further comprising performing an operation corresponding to the input for moving the indicator based on the input for moving the indicator being not regarding the object associated with critical movement.

18. A non-transitory computer-readable recording medium having recorded thereon a program, which when executed by a processor included in a display device, causes the display device to perform operations including:
based on the display device performing a screen mirroring with respect to a first screen of a mobile device, displaying a second screen corresponding to the first screen and an indicator;
receiving object information regarding one or more objects included in the first screen from the mobile device;
generating navigation map information of the one or more objects based on the object information; and
in response to an input for moving the indicator, controlling movement of the indicator based on the navigation map information.

* * * * *